United States Patent
Wright et al.

(10) Patent No.: US 12,552,416 B2
(45) Date of Patent: Feb. 17, 2026

(54) IDENTIFYING A CUSTOMER OF AN AUTONOMOUS VEHICLE

(71) Applicant: WAYMO LLC, Mountain View, CA (US)

(72) Inventors: Clement Wright, San Francisco, CA (US); Lauren Schwendimann, Burlingame, CA (US); Maria Moon, Mountain View, CA (US); Kevin Malta, Mountain View, CA (US); Ganesh Balachandran, Mountain View, CA (US); Jonathan Pedersen, San Francisco, CA (US); Daniella Gutlansky, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 21 days.

(21) Appl. No.: 18/410,403

(22) Filed: Jan. 11, 2024

(65) Prior Publication Data

US 2024/0140492 A1 May 2, 2024

Related U.S. Application Data

(63) Continuation of application No. 17/511,634, filed on Oct. 27, 2021, now Pat. No. 11,904,902.

(Continued)

(51) Int. Cl.
*B60W 60/00* (2020.01)
*G06Q 50/40* (2024.01)

(52) U.S. Cl.
CPC . *B60W 60/00256* (2020.02); *B60W 2420/403* (2013.01); *B60W 2420/408* (2024.01);

(Continued)

(58) Field of Classification Search
CPC ..... B60W 60/00256; B60W 2420/403; B60W 2420/408; B60W 2420/54;

(Continued)

(56) References Cited

U.S. PATENT DOCUMENTS

| 8,676,427 | B1 | 3/2014 | Ferguson et al. |
| 9,910,438 | B1* | 3/2018 | Arden .................. G05D 1/0088 |

(Continued)

FOREIGN PATENT DOCUMENTS

| DE | 102018206344 A1 | 10/2019 |
| WO | 2018213075 A1 | 11/2018 |
| WO | 2020197605 A1 | 10/2020 |

OTHER PUBLICATIONS

International Search Report and Written Opinion for Application No. PCT/US21/56798 dated Feb. 16, 2022 (12 pages).

(Continued)

*Primary Examiner* — Brian P Sweeney
(74) *Attorney, Agent, or Firm* — Botos Churchill IP Law LLP

(57) ABSTRACT

The technology employs a holistic approach to passenger pickups and other wayfinding situations. This includes identifying where passengers are relative to the vehicle and/or the pickup location. Information synthesis from different sensors, agent behavior prediction models, and real-time situational awareness are employed to identify the likelihood that the passenger to be picked up is at a given location at a particular point in time, with sufficient confidence. The system can provide adaptive navigation by helping passengers understand their distance and direction to the vehicle, for instance using various cues via an app on the person's device. Rider support tools may be provided, which enable a remote agent to interact with a customer via that person's device, such as using the camera on the device to provide wayfinding support to enable the person to find their vehicle.

(Continued)

Ride support may also use sensor information from the vehicle when providing wayfinding support.

24 Claims, 17 Drawing Sheets

Related U.S. Application Data

(60) Provisional application No. 63/107,180, filed on Oct. 29, 2020.

(52) U.S. Cl.
CPC ... *B60W 2420/54* (2013.01); *B60W 2540/041* (2020.02); *B60W 2540/043* (2020.02); *B60W 2554/4029* (2020.02); *B60W 2556/10* (2020.02); *B60W 2556/45* (2020.02); *G06Q 50/40* (2024.01)

(58) Field of Classification Search
CPC ..... B60W 2540/041; B60W 2540/043; B60W 2554/4029; B60W 2556/10; B60W 2556/45; B60W 60/0025; B60W 60/00253; B60W 40/08; B60W 2040/0809; G06Q 50/40; G06Q 10/02; G06V 20/58

See application file for complete search history.

(56) References Cited

U.S. PATENT DOCUMENTS

| | | |
|---|---|---|
| 2016/0161266 A1* | 6/2016 | Crawford ............... G01C 21/34 701/25 |
| 2017/0153714 A1 | 6/2017 | Gao et al. |
| 2018/0136656 A1 | 5/2018 | Rasmusson et al. |
| 2019/0227553 A1 | 7/2019 | Kentley-Klay et al. |
| 2019/0318158 A1 | 10/2019 | Qin et al. |
| 2020/0310461 A1 | 10/2020 | Kaufman et al. |
| 2021/0171046 A1 | 6/2021 | Blott et al. |

OTHER PUBLICATIONS

The Extended European Search Report for European Patent Application No. 21887414.7, Aug. 26, 2024, 8 Pages.

* cited by examiner

100

120

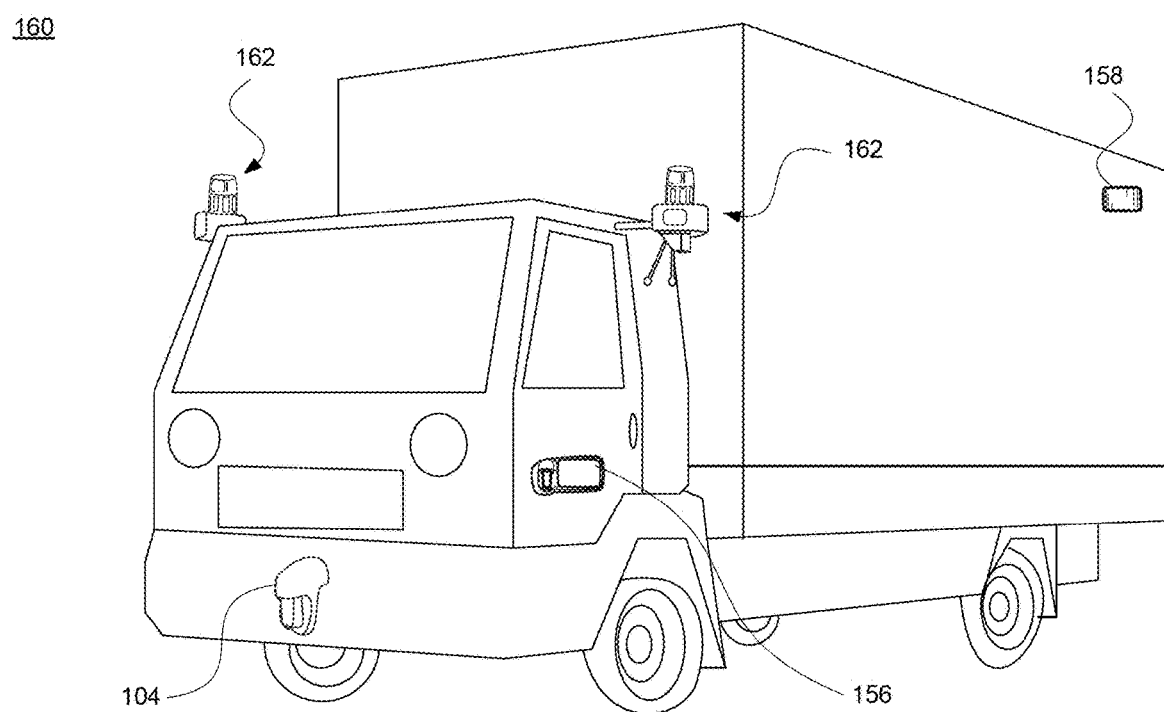

400

420

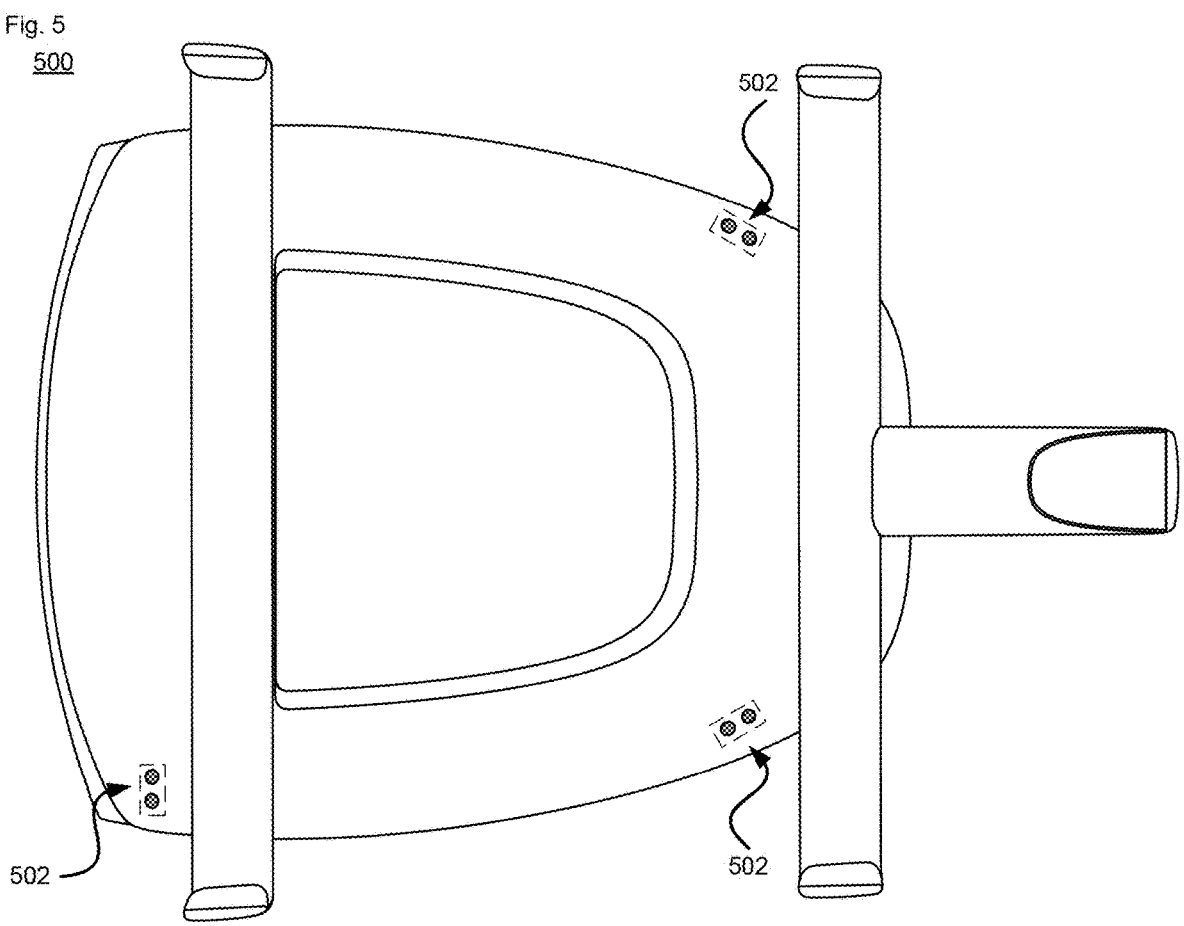

600

620

IDENTIFYING A CUSTOMER OF AN AUTONOMOUS VEHICLE

CROSS-REFERENCE TO RELATED APPLICATIONS

This application is a continuation of U.S. patent application Ser. No. 17/511,634, filed Oct. 27, 2021, which claims the benefit of the filing date of U.S. Provisional Patent Application No. 63/107,180, filed Oct. 29, 2020, the entire disclosures of which are incorporated herein by reference.

BACKGROUND

Autonomous vehicles, for instance, vehicles that may not require a human driver in certain driving situations, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings. This information is important for the vehicle's computing systems to make appropriate driving decisions for the vehicle. However, it may be challenging to identify which person in the vehicle's environment is the passenger to be picked up. This could adversely impact how the vehicle operates autonomously as it approaches a pickup location, and could result in miscommunication with the passenger or others in the vicinity.

BRIEF SUMMARY

The technology relates to a holistic approach to passenger pickups and related wayfinding situations. This includes robust techniques for identifying where passengers are relative to the vehicle and/or the pickup location. Signal synthesis from different sensors, agent prediction, and situational awareness can be employed by the system to identify the likelihood that the passenger to be picked up is at a given location at a particular point in time, with sufficient confidence. Knowing this enables the system to provide adaptive navigation by helping passengers understand their distance and direction to the vehicle, for instance using visual, audible and/or haptic cues via an app on the person's device such as a mobile phone or smartwatch. Rider support tools may be provided, which enable a remote agent to interact with the passenger via that person's device, such as using the camera on the device to provide wayfinding support to enable the person to find their vehicle. Ride support may also use sensor information from the vehicle when providing wayfinding support.

According to one aspect, a method for identifying a customer of a vehicle that is configured to operate in an autonomous driving mode is provided. The method comprises receiving, by one or more processors of a computing system of the vehicle, perception information regarding a set of objects in an external environment of the vehicle; determining, by the one or more processors, that the set of objects in the external environment includes a plurality of pedestrian objects, each pedestrian object corresponding to a person; applying information from at least two different sensor source types to a localization model to obtain a likelihood that each pedestrian object is the customer; evaluating, by the one or more processors, the likelihood that each pedestrian object is the customer; and upon determining that the likelihood for a given one of the pedestrian objects indicates that the given pedestrian object is likely the customer, performing at least one of: (i) sending a notification to a client device of the customer regarding a pickup location to meet the vehicle, (ii) adjusting the pickup location, (iii) causing modification to a driving operation of the vehicle in the autonomous driving mode, or (iv) transmitting information about the given pedestrian object to a remote management system.

In one example, the at least two different sensor source types are selected from the group consisting of client device sources associated with the customer, vehicle sources that are onboard the vehicle, and fleet sources obtained from one or more other vehicles in a fleet of vehicles. The vehicle sources may include one or more sensors of a perception system of the vehicle, positioning system sources, or communication system sources. The one or more sensors of the perception system may include one or more of lidar, camera, radar or acoustical sensors. The information from the at least two different sensor source types may include geolocation information from the client device of the customer and perception information from one or more sensors of a perception system of the vehicle.

Evaluating the likelihood that each pedestrian object is the customer may include refining a list of pedestrian objects that could be the customer. In one example, sending the notification to the client device of the customer includes requesting current or historical geolocation information of the client device. In another example, sending the notification to the client device of the customer includes providing updated walking directions or turn-by-turn directions. In a further example, sending the notification to the client device of the customer includes a request for the customer to perform a selected action. In yet another example, sending the notification to the client device of the customer includes selecting a timing for sending the notification based on a distance of the given pedestrian object to either the pickup location or to the vehicle. Sending the notification to the client device of the customer may alternatively or additional include selecting a specificity of a message to the customer based on a distance of the given pedestrian object to either the pickup location or to the vehicle.

The customer may be a rider scheduled to be picked up by the vehicle for a trip. Adjusting the pickup location may include moving the pickup location to a position closer to a current location of the customer to reduce a distance the customer would traverse. Transmitting information about the given pedestrian object to the remote management system may include a request for rider support from the remote management system.

According to another aspect, a vehicle is configured to operate in an autonomous driving mode. The vehicle comprises a perception system including one or more sensors that are configured to receive sensor data associated with objects in an external environment of the vehicle. The vehicle also comprises a driving system including a steering subsystem, an acceleration subsystem and a deceleration subsystem to control driving of the vehicle, a positioning system configured to determine a current position of the vehicle, and a control system including one or more processors. The control system is operatively coupled to the driving system, the perception system and the positioning system. The control system is configured to: receive perception information from the perception system regarding a set of objects in the external environment of the vehicle;

determine that the set of objects in the external environment includes a plurality of pedestrian objects, each pedestrian object corresponding to a person; apply information from at least two different sensor source types to a localization model to obtain a likelihood that each pedestrian object is a customer; evaluate the likelihood that each pedestrian object is the customer; and upon determining that the likelihood for a given one of the pedestrian objects indicates that the given pedestrian object is likely the customer, perform at least one of: (i) send a notification to a client device of the customer regarding a pickup location to meet the vehicle, (ii) adjust the pickup location, (iii) cause modification to a driving operation to be performed by the driving system in the autonomous driving mode, or (iv) transmit information about the given pedestrian object to a remote management system. In one example, the vehicle is configured to deliver a package to the customer at the pickup location.

The information from the at least two different sensor source types may include geolocation information from the client device of the customer and perception information from the one or more sensors of a perception system. Evaluation of the likelihood that each pedestrian object is the customer may include refinement of a list of pedestrian objects that could be the customer. The control system may be further configured to issue a request to the client device of the customer for updated location information upon a determination that the customer is within a threshold proximity to the vehicle or to the pickup location. And the control system may be further configured to issue a request for one or more other vehicles to provide sensor information from the external environment of the vehicle, and to apply the provided sensor to the localization model.

BRIEF DESCRIPTION OF THE DRAWINGS

FIGS. 1C-E illustrate example cargo and delivery type vehicles configured for use with aspects of the technology.

FIG. 5 illustrates a view of a sensor assembly in accordance with aspects of the technology.

DETAILED DESCRIPTION

Figure 1A:
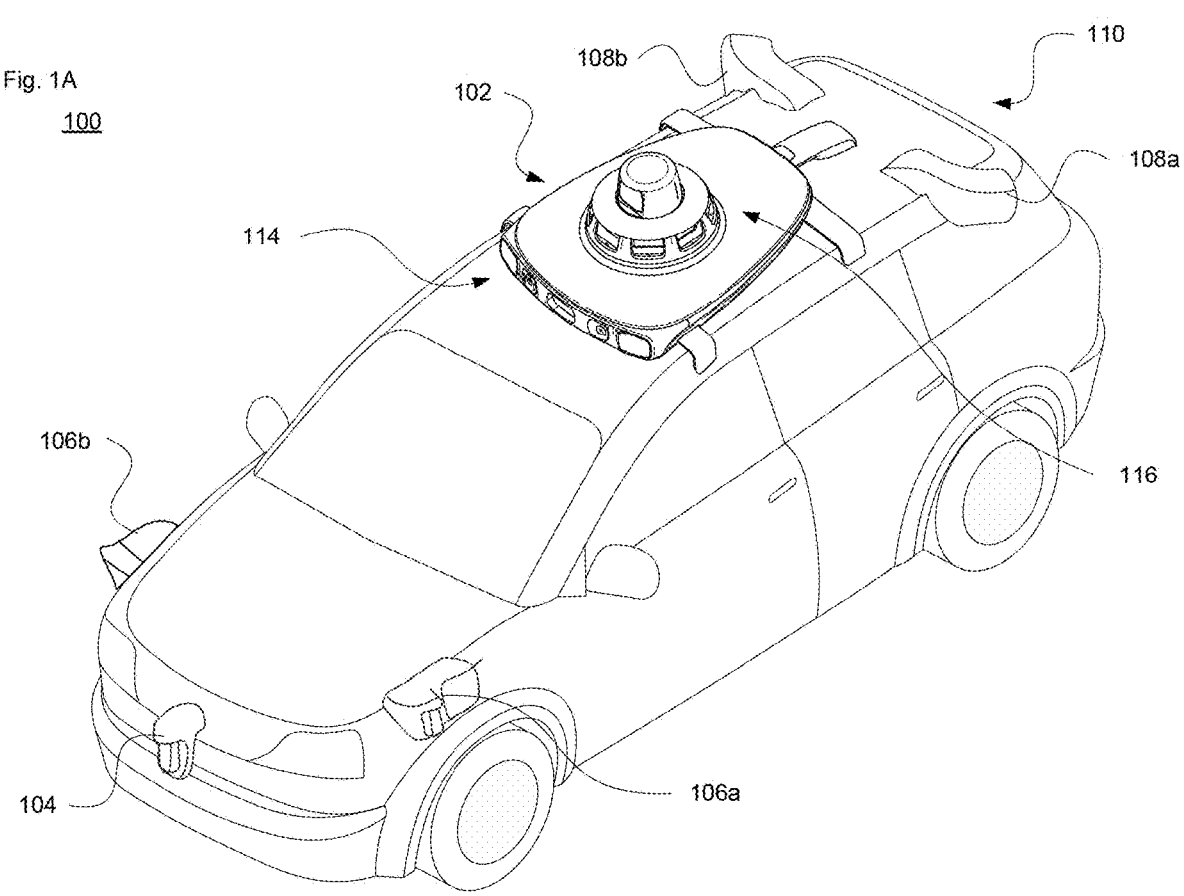
FIGS. 1A-B illustrate example self-driving vehicles in accordance with aspects of the technology.

Wayfinding in complex environments, such as dense urban areas or during rush hour, can be a challenge for people with and without disabilities, and is critical for riders or other customers using an autonomous vehicle service. A holistic approach according to aspects of the technology incorporates a broad set of features that work together to provide appropriate assistance to a diverse group of riders in a variety of situations. For instance, this allows autonomous vehicle riders with disabilities to quickly and easily find their vehicle at pickup and their destination at drop-off. As a result, the various wayfinding features can help to provide greater independence and freedom of mobility for these riders.

Autonomous vehicle systems consider safety, applicable traffic laws, and other constraints when selecting where the vehicle should pull over, and this can sometimes result in counterintuitive pickup and drop-off locations for the rider or other customer. For example, the vehicle may pull over farther down the road than expected, or behind a building, or on the opposite side of the street from the rider or the planned destination. Since the rider in a fully autonomous vehicle cannot communicate with an in-vehicle human driver or ask them to adjust the pullover, it can be inconvenient or challenging for the rider to find the vehicle or desired destination at pickup or drop-off. Furthermore, wayfinding can present a particular challenge for riders with vision and cognitive disabilities, but may also affect riders with hearing and ambulatory disabilities, riders with no disabilities at all, or even customers who are receiving a package or other delivery from the autonomous vehicle.

There can be various high-level needs for wayfinding to the vehicle at pickup or to the destination at drop-off. Examples of this include the following. Predictability: riders want to know where the vehicle will pull over and be aware of any potential wayfinding challenges ahead of time, before they encounter them. Proximity riders may want the shortest possible walking distances to and from the vehicle (e.g., curbside pickup/drop-off), although a longer walking distance may be beneficial if it significantly helps pickup and/or drop-off ETA. Simplicity: riders may prefer fewer road users and obstacles to negotiate while wayfinding. Street crossings and large parking lots can be particularly difficult, while curbside can be easiest and/or safest to manage. For instance, avoiding the need to negotiate other road users and obstacles, and in particular crossing the street or navigating unpredictable large parking lots, may be a priority. Flexibility: riders may not want a one-size-fits-all approach, so different tools may be necessary for different needs in different situations for different riders. Patience: riders may want the vehicle to wait long enough at pickup for them to find it, especially when wayfinding may take additional time. Assistance: riders may want help to be available as a backup when they need it, but they may want to complete the wayfinding task independently.

According to one aspect of the technology, the rider's location (e.g., based on information from their mobile phone or smartwatch) can be used by a backend services layer to understand the distance and direction from the rider to the car. This could be coupled with Bluetooth Low Energy (BLE) and/or other sensor recognition when the passenger is closer to the vehicle. Displaying the distance to the car as a text field within the app is straightforward in theory. However, having confidence in location and orientation accuracy is also important. For example, information regarding the distance to the vehicle may be provided with a granularity of yards instead of feet, to not imply higher accuracy than exists. Similarly, generating appropriate haptic vibrations is a small technological challenge in a handheld device, but using them to effectively guide the user can be a large user design challenge. Linking out to turn-by-turn walking navigation in an existing consumer map app may be considerably more straightforward. However, certain map apps may not be optimized for autonomous vehicle use cases. For instance, if the vehicle needs to update its location after the rider has already shifted into the other app, there may be no efficient way to update the target location programmatically in that app's walking navigation.

There can be significant complexity to detecting the rider's proximity to the vehicle or a pickup location with a selected degree of confidence, as well as complexity in employing beneficial signals to play at the right time to assist in wayfinding. Thus, one aspect of the technology includes various techniques to identify the location of a given rider or other customer in real time. This can include synthesizing signals from different sensors of the vehicle, rider's device or other device, object prediction using behavior models and sensor information, as well as situational awareness that can provide contextual cues as to rider location. Having sufficient confidence in the real-time location of the rider allows the system to provide a rich variety of wayfinding information and assistance to the rider.

Example Vehicle Systems

Figure 1B:
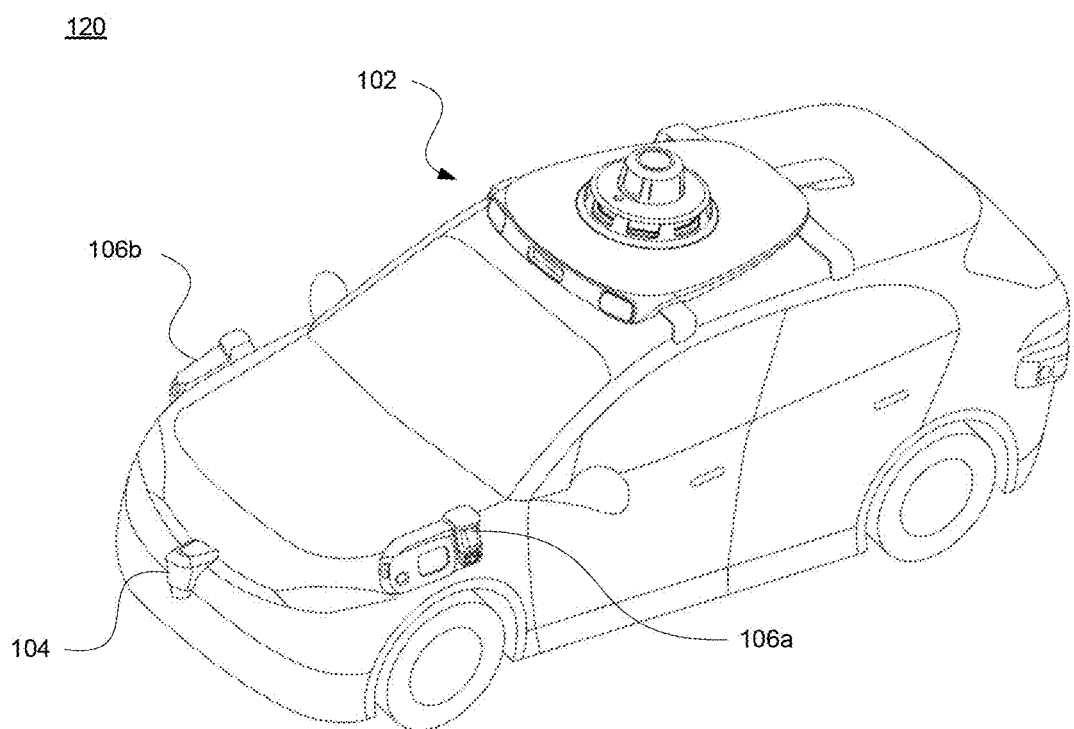
Figure 1C:
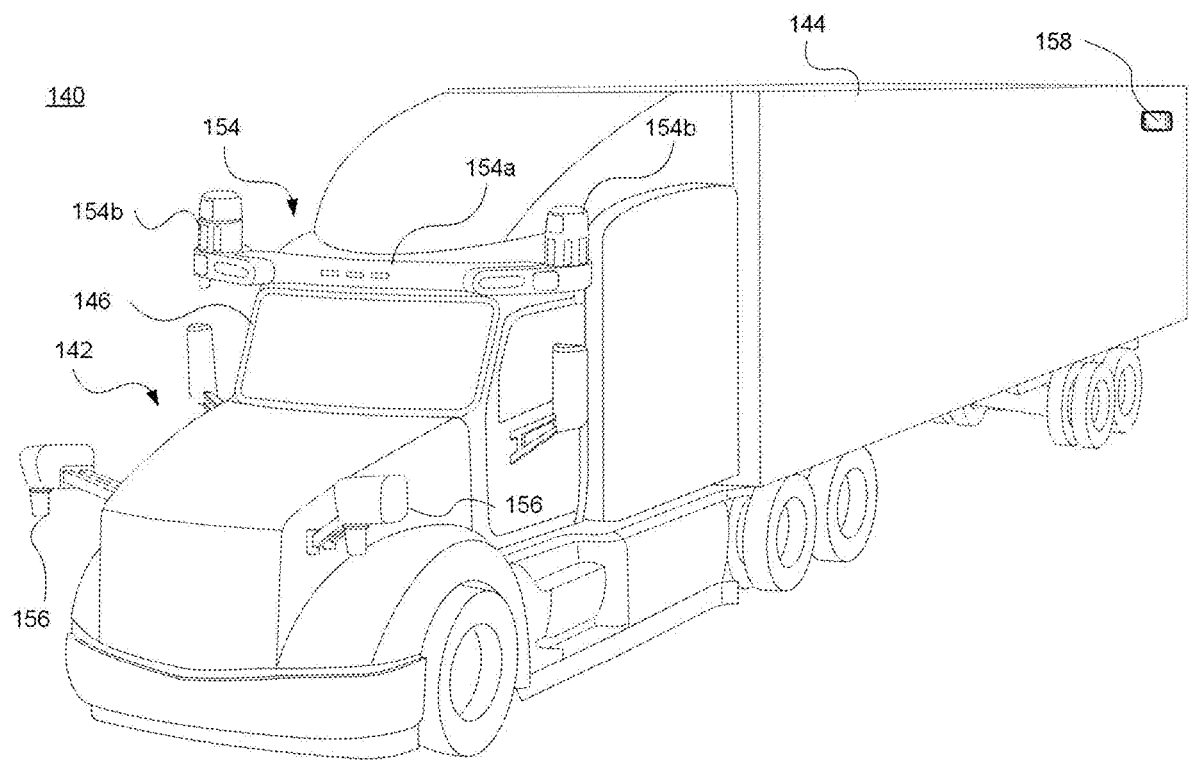
Figure 1D:
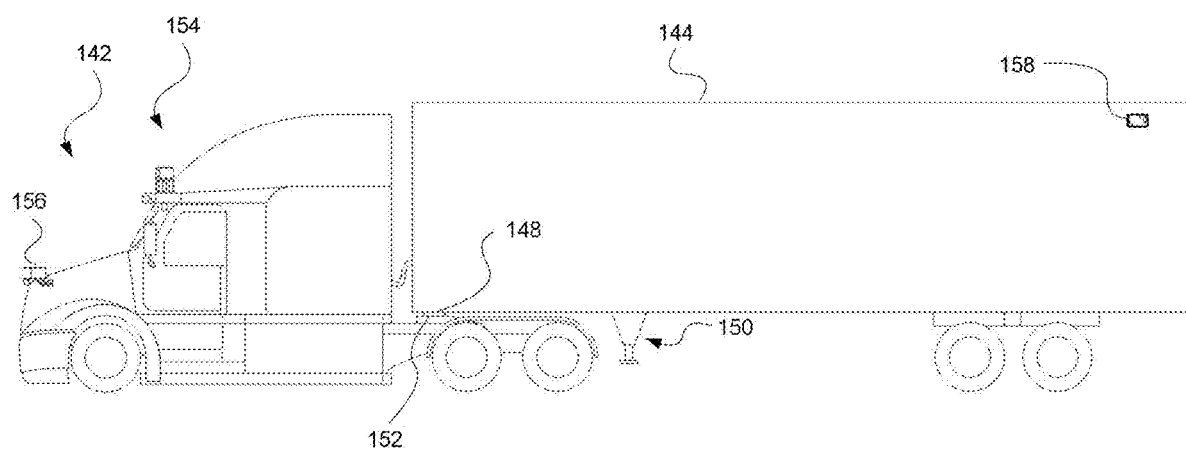

FIG. 1A illustrates a perspective view of an example passenger vehicle 100, such as a minivan or sport utility vehicle (SUV). FIG. 1B illustrates a perspective view of another example passenger vehicle 120, such as a sedan or crossover. The passenger vehicles may include various sensors for obtaining information about the vehicle's external environment. FIGS. 1C-D illustrate an example tractor-trailer type cargo vehicle 140. And FIG. 1E illustrates a smaller cargo vehicle 160, such as a panel truck for local deliveries.

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified autonomy different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed. In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode. The technology may be employed in all manner of vehicles configured to operate in an autonomous driving mode, including vehicles that transport passengers or items such as food deliveries, packages, cargo, etc. While certain aspects of the disclosure are particularly useful in connection with specific types of vehicles, the vehicle may be any type of vehicle including, but not limited to, cars, vans, motorcycles, cargo vehicles, buses, recreational vehicles, emergency vehicles, etc.

For instance, as shown in FIG. 1A, the vehicle may include a roof-top housing unit (roof pod assembly) 102 may include one or more lidar sensors as well as various cameras (e.g., optical or infrared), radar units, acoustical sensors (e.g., microphone or sonar-type sensors, ultrasonic sensors, or the like), inertial (e.g., accelerometer, gyroscope, etc.) or other sensors (e.g., positioning sensors such as GPS sensors). Housing unit 102 may have any number of different configurations, such as domes, cylinders, "cake-top" shapes, etc. Housing 104, located at the front end of vehicle 100, and housings 106a, 106b on the driver's and passenger's sides of the vehicle may each incorporate lidar, radar, camera, acoustical and/or other sensors. For example, housing 106a may be located in front of the driver's side door along a quarter panel of the vehicle. As shown, the passenger vehicle 100 also includes housings 108a, 108b for, e.g., radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

In this example, arrow 114 indicates that the roof pod 102 as shown includes a base section coupled to the roof of the vehicle. And arrow 116 indicated that the roof pod 102 also includes an upper section (e.g., with the dome, cylinder or cake-top shape) raised above the base section. Each of the base section and upper section may house different sensor units configured to obtain information about objects and conditions in the environment around the vehicle. The roof pod 102 and other sensor housings may also be disposed along vehicle 120 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

The example cargo vehicle 140 of FIGS. 1C-D is a tractor-trailer truck. The truck may include, e.g., a single, double or triple trailer, or may be another medium or heavy-duty truck such as in commercial weight classes 4 through 8. As shown, the truck includes a tractor unit 142 and a single cargo unit or trailer 144. The trailer 144 may be fully enclosed, open such as a flat bed, or partially open depending on the type of goods or other cargo to be transported. In this example, the tractor unit 142 includes the engine and steering systems (not shown) and a cab 146 for a driver and any passengers.

As seen in the side view of FIG. 1D, the trailer 144 includes a hitching point, known as a kingpin, 148, as well as landing gear 150 for when the trailer is detached from the tractor unit. The kingpin 148 is typically formed as a solid steel shaft, which is configured to pivotally attach to the tractor unit 142. In particular, the kingpin 148 attaches to a trailer coupling 152, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 154 and 156 disposed therealong. For instance, sensor unit 154 may be disposed on a roof or top portion of the cab. The sensor unit 154 may be a sensor suite having an elongated central member 154a with one or more types of sensors located therealong (e.g., camera and/or radar modules) and side members 154b that may include other sensor types (e.g., short range lidar modules capable of detecting objects within 10-25 meters of the vehicle and/or long range lidar modules capable of detecting objects beyond 15-20 meters and up to 100-250 meters). Sensor units 156 may be disposed on left and/or right sides of the cab. Sensor units may also be located along other regions of the cab, such as along the front bumper or hood area, in the rear of the cab, adjacent to the fifth-wheel, underneath the chassis, etc. The trailer 154 may also have one or more sensor units 158 disposed therealong, for instance along one or both side panels, front, rear, roof and/or undercarriage of the trailer 154.

The perspective view 160 of FIG. 1E illustrates an example panel truck or other vehicle that may be suitable for local deliveries (e.g., groceries, meals, mail or other packages, etc.). Here, in contrast to the roof-top housing unit 154 shown in FIGS. 1C-D, the truck 160 may have a pair of sensor assemblies disposed in housings 162 on either side of the vehicle.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors such as geolocation-based (e.g., GPS) positioning sensors, load cell or pressure sensors (e.g., piezoelectric or mechanical), inertial (e.g., accelerometer, gyroscope, etc.).

Figure 2:
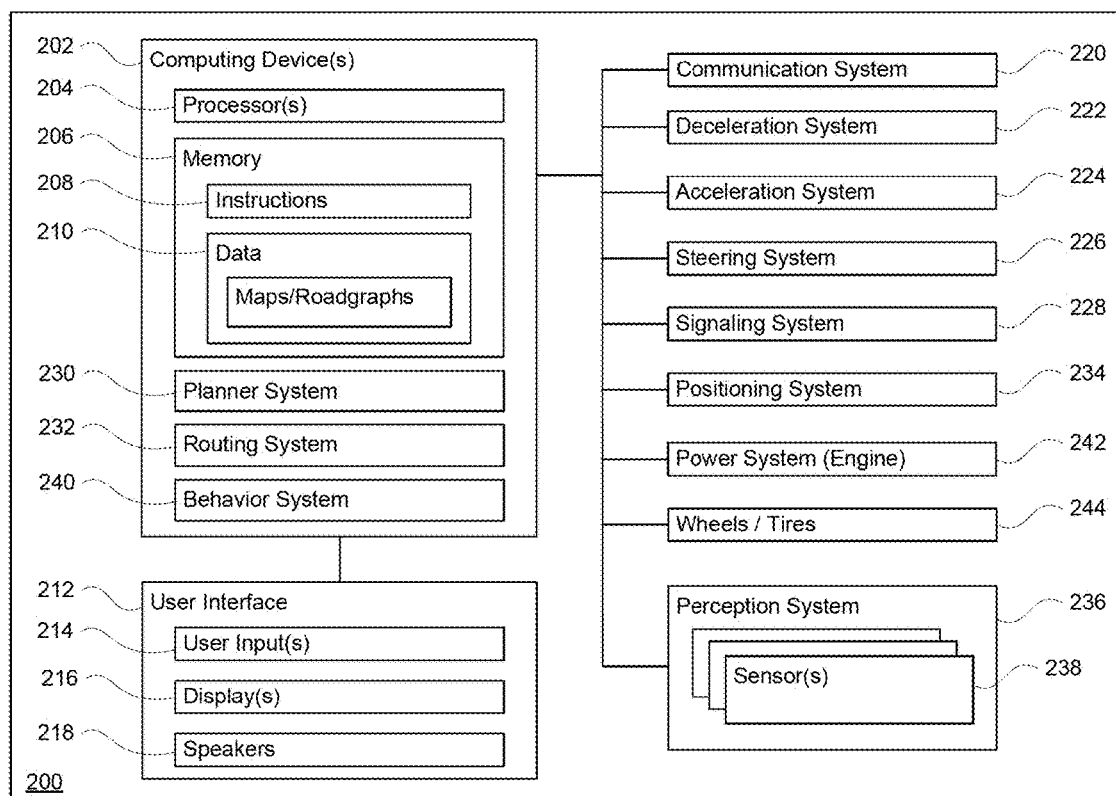
FIG. 2 illustrates components of a self-driving vehicle in accordance with aspects of the technology.

As shown in system diagram 200 of FIG. 2, the vehicle such as vehicle 100, 120 or 160 may have one or more computing devices, such as computing device 202 containing one or more processors 204, memory 206 and other components typically present in general purpose computing devices.

The memory 206 stores information accessible by the one or more processors 204, including and instructions 208 and data 210 that may be executed or otherwise used by the processor(s) 204. The memory 206 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by processor 204 in accordance with the instructions 208. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 204 may be any conventional processors, such as commercially available CPUs, GPUs or TPUs. Alternatively, the one or more processors may include a dedicated device such as an ASIC or other hardware-based processor. Although FIG. 2 functionally illustrates the processor, memory, and other elements of computing device 202 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 202. Accordingly, references to a processor or computing device will be understood to include references to a collection of processors or computing devices or memories that may or may not operate in parallel.

Computing devices 202 may include all of the components normally used in connection with a computing device such as the processor and memory described above as well as a user interface 212 having one or more user inputs 214 (e.g., one or more of a button, mouse, keyboard, touch screen, gesture input and/or microphone), various electronic displays 216 (e.g., a monitor having a screen or any other electrical device that is operable to display information), and speakers 218 to provide information to a passenger of the autonomous vehicle or other people as needed. For example, electronic display 216 may be located within a cabin of autonomous vehicle 100, 120 or 160 and may be used by computing devices 202 to provide information to passengers or delivery personnel within the autonomous vehicle 100, 120 or 160.

Computing devices 202 may also include a communication system 220 having one or more wireless connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 202 may be part of an autonomous control system for the autonomous vehicle 100, 120 or 160 and may be capable of communicating with various components of the vehicle in order to control the vehicle in an autonomous driving mode. For example, computing devices 202 may be in communication with various systems of autonomous vehicle 100, 120 or 160, such as deceleration system 222, acceleration system 224, steering system 226, signaling system 228, planning system 230 (also referred to as a planning/trajectory module), routing system 232, positioning system 234 (for determining the position of the vehicle such as its pose, e.g., position and orientation along the roadway or pitch, yaw and roll of the vehicle chassis relative to a coordinate system), perception system 236 having one or more sensors 238, behavior modeling system 240 (also referred to as a behavior module), and power system 242 in order to control the movement, speed, etc. of autonomous vehicle 100, 120 or 160 in accordance with the instructions 208 of memory 206 in the autonomous driving mode.

As an example, computing devices 202 may interact with deceleration system 222 and acceleration system 224 in order to control the speed of the vehicle. Similarly, steering system 226 may be used by computing devices 202 in order to control the direction of autonomous vehicle 100, 120 or 160. For example, if autonomous vehicle 100, 120 or 160 is configured for use on a road, such as a car or truck, steering system 226 may include components to control the angle of wheels 244 to turn the vehicle. Some or all of the wheels/tires 244 are coupled to deceleration, acceleration and/or steering systems. The computing devices 202 may be able to receive information about tire pressure, balance and other factors that may impact driving in an autonomous mode. Computing devices 202 may also use the signaling system 228 in order to signal the vehicle's intent to other drivers or vehicles, for example, by lighting turn signals or brake lights when needed.

Routing system 232 may be used by computing devices 202 in order to generate a route to a destination using map information. Planning system 230 may be used by computing device 202 in order to generate short-term trajectories that allow the vehicle to follow routes generated by the routing system. In this regard, the planning system 230 and/or routing system 232 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices discussed below or other computing devices), pullover spots, vegetation, or other such objects and information.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 232 may use the aforementioned map information to determine a route from a current location (e.g., a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 234 may be used by computing devices 202 in order to determine the vehicle's relative or absolute position on a map or on the earth. For example, the positioning system 234 may include a GPS receiver or to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of a roadgraph as well as relative location information, such as location relative to other cars immediately around it, which can often be determined with less noise than the absolute geographical location.

The positioning system 234 may also include other devices in communication with computing devices 202, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 236 includes one or more components (sensors 238) for detecting objects external to the vehicle such as other road users (vehicles, pedestrians, bicyclists, etc.) obstacles in the roadway, traffic signals, signs, trees, buildings, etc. For example, the sensors 238 of the perception system 236 may include lidar, sonar, radar, cameras, microphones (e.g., in an acoustical array for instance arranged along the roof pod 102), pressure or inertial sensors, strain gauges, and/or any other detection devices that generate and/or record data which may be processed by the computing devices of computing devices 202. In the case where the vehicle is a passenger vehicle such as a minivan 100 or car 120, the vehicle may include lidar, cameras, and/or other sensors mounted on or near the roof, fenders, bumpers or other convenient locations as shown in FIGS. 1A-B.

Such sensors of the perception system 236 may detect objects in the vehicle's external environment and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 236 may also include other sensors within the vehicle to detect objects and conditions within the vehicle, such as in the passenger compartment or storage compartment (e.g., trunk). For instance, such sensors may detect one or more persons, pets, packages, etc., as well as conditions within and/or outside the vehicle such as temperature, humidity, etc. Still further, sensors 238 of the perception system 236 may measure the rate of rotation of the wheels 244, an amount or a type of braking by the deceleration system 222, and other factors associated with the equipment of the vehicle itself.

The raw data obtained by the sensors (e.g., camera imagery, lidar point cloud data, radar return signals, acoustical information, etc.) can be processed by the perception system 236 and/or sent for further processing to the computing devices 202 periodically or continuously as the data is generated by the perception system 236. Computing devices 202 may use the positioning system 234 to determine the vehicle's location and perception system 236 to detect and respond to objects and roadway information (e.g., signage or road markings) when needed to reach the location safely, such as by adjustments made by planner/trajectory module 230, including adjustments in operation to deal with sensor occlusions and other issues.

In some instances, object characteristics may be input into a behavior prediction system software module of the behavior modeling system 240 which uses various behavior models based on object type to output one or more predicted future behaviors for a detected object. Object trajectories may be a list of positions and orientations or headings (e.g., poses) as well as other predicted characteristics such as speed, acceleration or deceleration, rate of change of acceleration or deceleration, etc. In other instances, the characteristics obtained from the perception system 236 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted future behaviors, various likelihoods from detection system software modules, the map information identifying the vehicle's environment, position information from the positioning system 234 identifying the location and orientation of the vehicle, a destination location or node for the vehicle as well as feedback from various other systems of the vehicle may be input into a planning system software module of the planner system 230. The planner system 230 may use this input to generate trajectories for the vehicle to follow for some brief period of time into the future based on a route generated by a routing module of the routing system 232. In this regard, the trajectories may define the specific characteristics of acceleration, deceleration, speed, direction, etc. to allow the vehicle to follow the route towards reaching a destination. A control system software module of computing devices 202 may be configured to control movement of the vehicle, for instance by controlling braking, acceleration and steering of the vehicle, in order to follow a trajectory.

The computing devices 202 may control the vehicle in one or more of the autonomous driving modes by controlling various components. For instance, by way of example, computing devices 202 may navigate the vehicle to a destination location completely autonomously using data from the detailed map information and planner system 230. Computing devices 202 may use the positioning system 234 to determine the vehicle's location and perception system 236 to detect and respond to objects when needed to reach the location safely. Again, in order to do so, computing device 202 and/or planner system 230 may generate trajectories and cause the vehicle to follow these trajectories, for instance, by causing the vehicle to accelerate (e.g., by supplying fuel or other energy to the engine or power system 242 by acceleration system 224), decelerate (e.g., by decreasing the fuel supplied to the engine or power system 242, changing gears, and/or by applying brakes by deceleration system 222), change direction (e.g., by turning the front or rear wheels of autonomous vehicle 100, 120 or 160 by steering system 226), and signal such changes (e.g., by lighting turn signals) using the signaling system 228. Thus, the acceleration system 224 and deceleration system 222 may be part of a drivetrain that includes various components between an engine of the vehicle and the wheels of the vehicle. Again, by controlling these systems, computing devices 202 may also control the drivetrain of the vehicle in order to maneuver the vehicle autonomously.

Figure 3A:
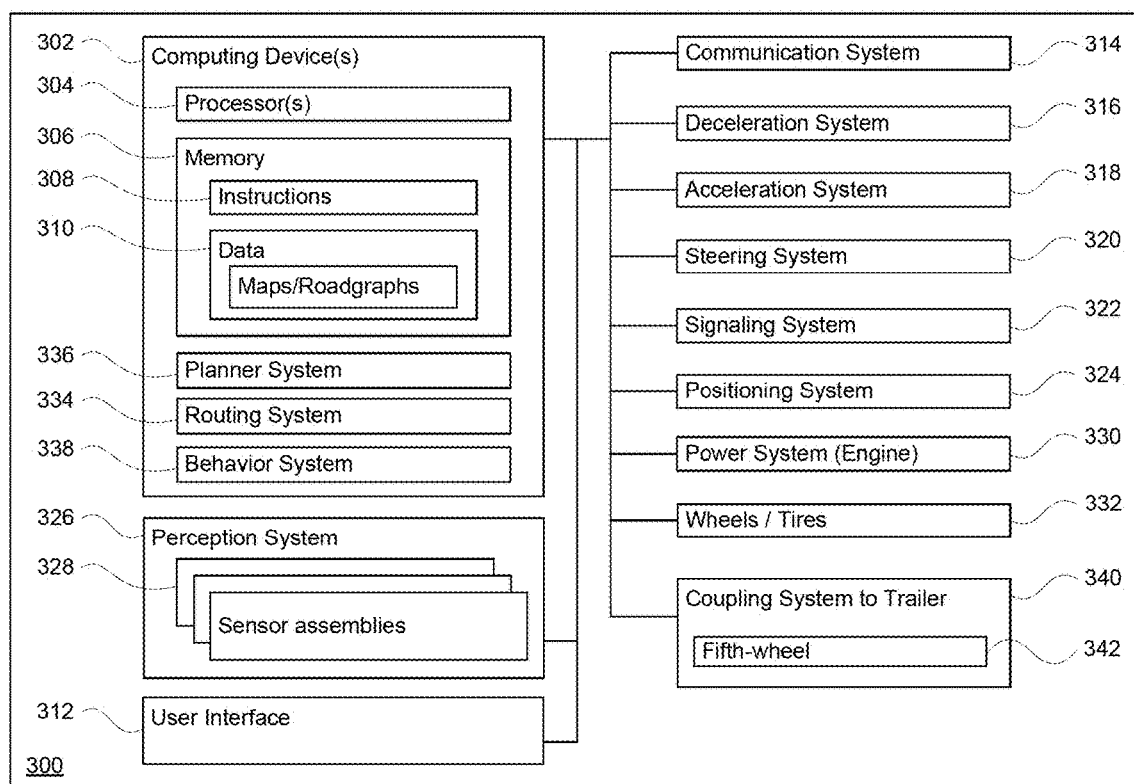
FIGS. 3A-B are block diagrams of systems of an example cargo-type vehicle in accordance with aspects of the technology.

FIG. 3A illustrates a block diagram 300 with various components and systems of a vehicle, e.g., vehicle 140 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs).

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308. Here, as above, the system may include a user interface 312 having one or more user inputs, various electronic displays, and speakers.

In one example, the computing devices 302 may form an autonomous driving computing system incorporated into vehicle 140. Similar to the arrangement discussed above regarding FIG. 2, the autonomous driving computing system of block diagram 300 may be capable of communicating with various components of the vehicle in order to perform route planning and driving operations. Communication system 314 may provide one or more wireless connections in the manner described above for communication system 220. In addition or alternatively, the communication system may include the vehicle's internal communication bus (e.g., a Controller Area Network (CAN) bus or a FlexRay bus).

For example, the computing devices 302 may be in communication with various systems of the vehicle, such as a driving system including a deceleration system 316, acceleration system 318, steering system 320, signaling system 322, and a positioning system 324, each of which may function as discussed above regarding FIG. 2.

The computing devices 302 are also operatively coupled to a perception system 326 having one or more sensor assemblies 328, as well as a power system 330. Some or all of the wheels/tires 332 are coupled to the driving system, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information, routing system 334, planner system 336 and/or behavior system 338. For instance, computing devices 302 may employ a planner/trajectory module of the planner system 336 in conjunction with the positioning system 324, the sensor assemblies 328 of the perception system 326 and the routing system 334 to detect and respond to objects when needed to reach the location safely, similar to the manner described above for FIG. 2.

Similar to perception system 236, the perception system 326 also includes one or more sensors or other components such as those described above for detecting objects external to the vehicle, objects or conditions internal to the vehicle, and/or operation of certain vehicle equipment such as the wheels and driving system. Each sensor assembly 328 may include one or more sensors. In one example, a pair of sensor assemblies 328 may be arranged as sensor towers integrated into the side-view mirrors on the truck, farm equipment, construction equipment or the like. In another example, sensor assemblies 328 may also be positioned at different locations on the tractor unit 142 or on the trailer 144, as noted above with regard to FIGS. 1C-D. The computing devices 302 may communicate with the sensor assemblies located on both the tractor unit 142 and the trailer 144. Each assembly may have one or more types of sensors such as those described above.

Also shown in FIG. 3A is a coupling system 340 for connectivity between the tractor unit and the trailer. The coupling system 340 may include one or more power and/or pneumatic connections (not shown), and a fifth-wheel 342 at the tractor unit for mechanical connection to the kingpin at the trailer.

Figure 3B:
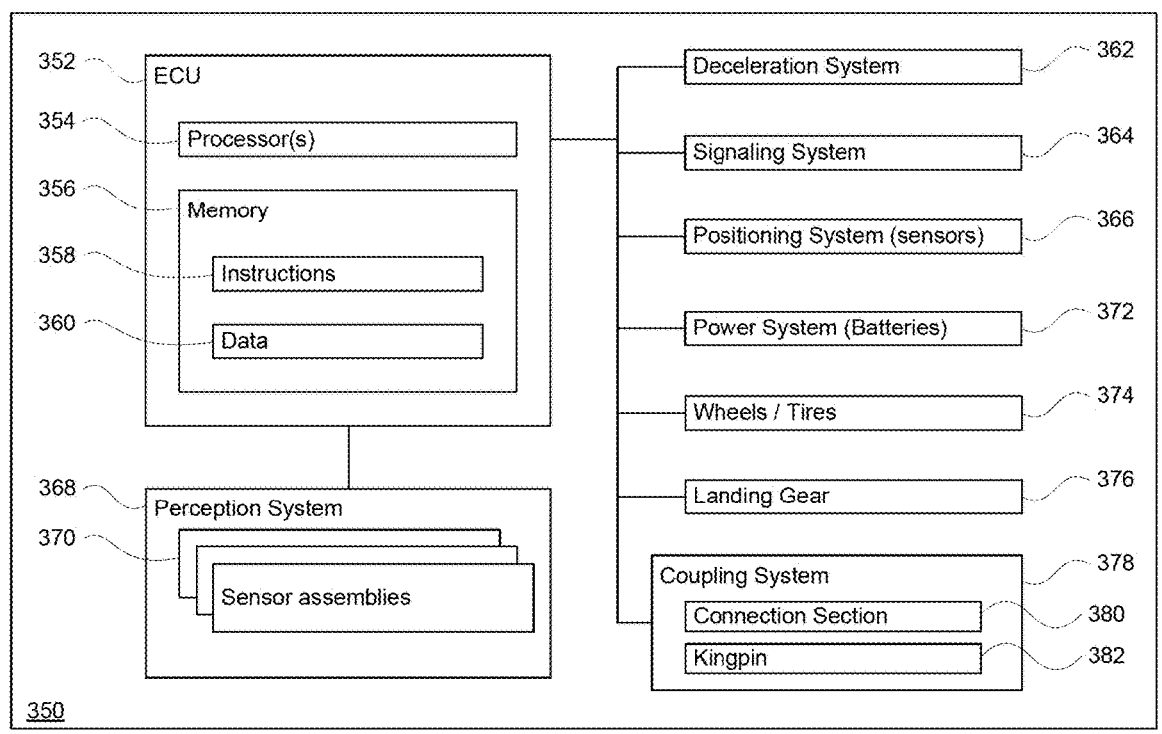

FIG. 3B illustrates a block diagram 350 of systems of an example trailer, such as trailer 144 of FIGS. 1C-D. As shown in this example, the system includes a trailer ECU 352 of one or more computing devices, such as computing devices containing one or more processors 354, memory 356 and other components typically present in general purpose computing devices. The memory 356 stores information accessible by the one or more processors 354, including instructions 358 and data 360 that may be executed or otherwise used by the processor(s) 354. The descriptions of the processors, memory, instructions and data from FIGS. 2 and 3A apply to these elements of FIG. 3B.

The trailer ECU 352 in this example is configured to receive information and control signals from the tractor unit, as well as information from various trailer components. The on-board processors 354 of the ECU 352 may communicate with various systems of the trailer, including a deceleration system 362, signaling system 364, and a positioning system 366. The ECU 352 may also be operatively coupled to a perception system 368 with one or more sensors arranged in sensor assemblies 370 for detecting objects in the trailer's driving environment. The ECU 352 may also be operatively coupled with a power system 372 (for example, a battery power supply) to provide power to local components. Some or all of the wheels/tires 374 of the trailer may be coupled to the deceleration system 362, and the processors 354 may be able to receive information about tire pressure, balance, wheel speed and other factors that may impact driving in an autonomous mode, and to relay that information to the processing system of the tractor unit. The deceleration system 362, signaling system 364, positioning system 366, perception system 368, power system 372 and wheels/tires 374 may operate in a manner such as described above with regard to FIGS. 2 and 3A.

The trailer also includes a set of landing gear 376, as well as a coupling system 378. The landing gear may provide a support structure for the trailer when decoupled from the tractor unit. The coupling system 378, which may be a part of coupling system 340 of FIG. 3A, provides connectivity between the trailer and the tractor unit. Thus, the coupling system 378 may include a connection section 380 (e.g., for communication, power and/or pneumatic links to the tractor unit). In this example, the coupling system also includes a kingpin 382 configured for connectivity with the fifth-wheel of the tractor unit.

Example Implementations

Figure 4A:
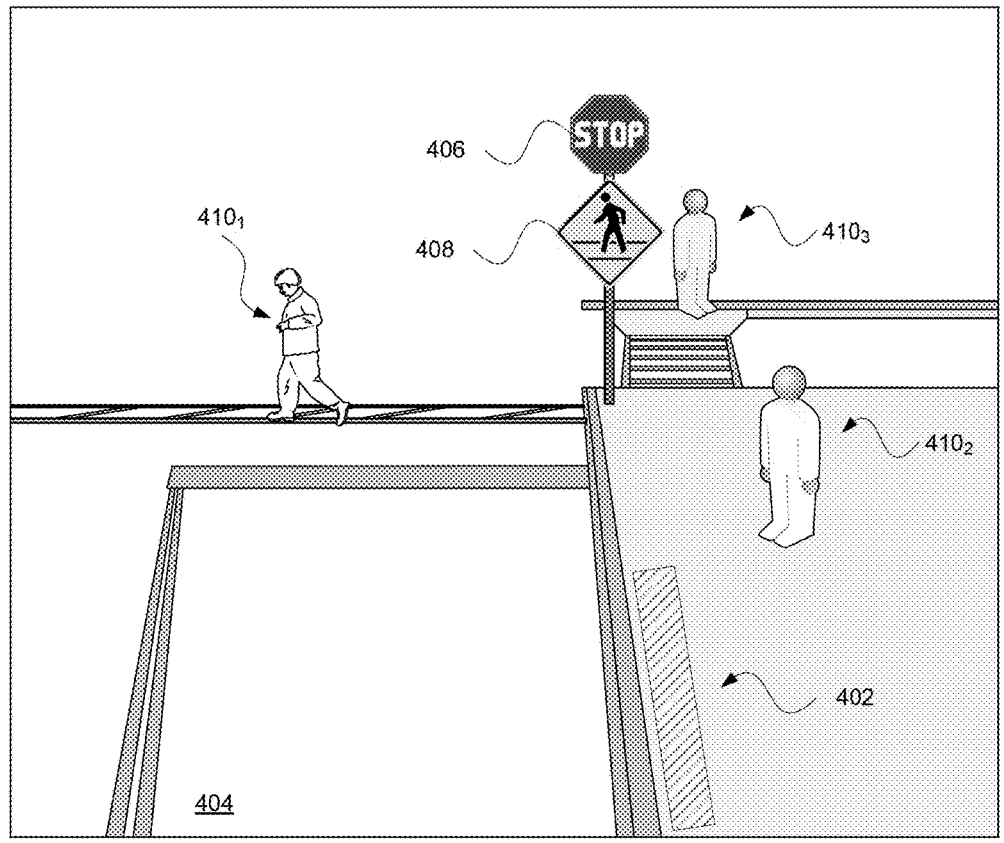
FIGS. 4A-B illustrate a pickup situation in accordance with aspects of the technology.

FIG. 4A is an example pickup situation 400, illustrating a pickup location 402 adjacent to a section of roadway 404. In this example, the pickup location 402 may be arranged when the rider to be picked up by an autonomous vehicle schedules a trip, for instance by using an app on their mobile phone or other device (e.g., tablet PC, smartwatch, etc.). The app may be used to schedule the trip with an autonomous vehicle ride hailing service. The person scheduling the trip may select the pickup location 402, which may be adjusted by the rider or the service prior to the actual pick up time. The service may select which vehicle in a fleet is to pick up the rider. In this situation, the vehicle (not shown) approaches the pickup location 402. As it approaches, the vehicle may detect the presence of different objects on or adjacent to the roadway, including a stop sign 406 and a pedestrian crossing sign 408, as well as different people $410_1$, $410_2$ and $410_3$. In this example the detection is done using one or more sensors of the vehicle's perception system, such as lidar and/or camera sensors.

However, merely identifying the presence of people $410_1$-$410_3$ is likely insufficient in most situations to determine which person is the one to be picked up by the assigned vehicle. For instance, just because person $410_2$ is the one physically closest to the designated pickup location 402 does not mean that that is the rider. Or while person $410_1$ may be determined to have a walking path in the crosswalk away from the intersection, that does not necessarily mean that they are not the rider. Here, person $410_1$ may be walking around to the other side of the vehicle in order to enter it. And while person $410_3$ may appear to be facing away from the designated pickup location 402, that does not necessarily mean that they are moving in a direction away from it. Rather, they could be making sure there is no oncoming traffic before crossing the street.

Figure 4B:
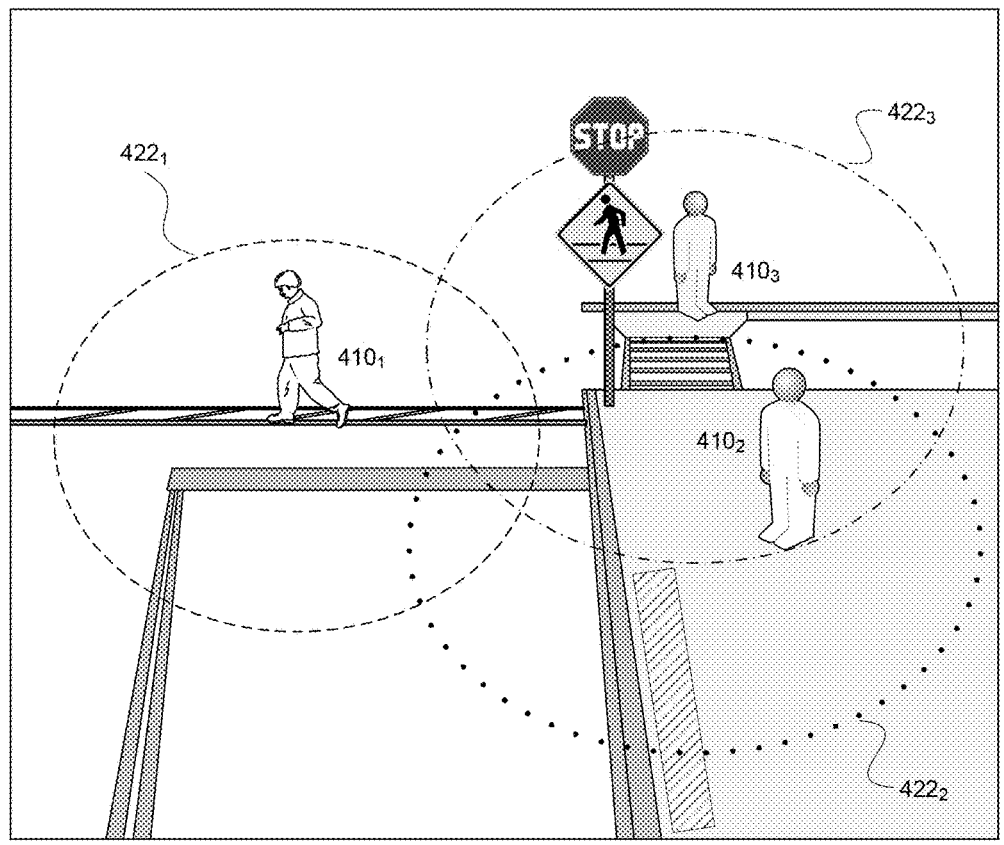

In some situations, location information from a client device of the rider can be used to identify where they currently are. This can often be useful to give an approximate position. The location information may be based on different sources (e.g., a global positioning system, WiFi or Bluetooth signals, cellular triangulation, etc.). Each source may have a limited granularity on the order of meters or tens of meters. The granularity of the location information may be adversely affected by tall obstructions such as skyscrapers or large trees with a dense leaf canopy, reflected radiofrequency (RF) signals, signal attenuation, etc. The result may be an approximate location encompassing some area of uncertainty. For instance, view 420 of FIG. 4B illustrates each person $410_1$-$410_3$ having an area of uncertainty $422_1$, $422_2$ or $422_3$ based on the location information from their respective client devices, as shown by the dashed, dotted or dash-dotted lines. As shown, the areas of uncertainty may overlap. Thus, if the system were using location information obtained by a client device and evaluating it in relation to imagery showing the different people 410 in the scene, it would likely not be accurate enough to allow the vehicle to determine which person is the rider.

In order to address these issues and achieve a high confidence that a person in the scene is the rider (e.g., 85%-90% or higher), the system may use additional information from different sensor sources. The sensor sources may include client device sources associated with the rider, vehicle sources that are onboard the vehicle including the perception system and positioning system, fleet sources obtained from other vehicles in the fleet, and/or other sources. The information from each source may be more or less helpful depending on a particular situation. The approach may include using a trained rider localization model to obtain a likelihood that a particular person is the rider. Other information can also be employed, for instance a visit history. Here, if a rider has previously visited a place several times and has a pattern of where they wait, such information in conjunction with the other factors describe can add confidence on locating/identifying the rider.

By way of example, client device sensor information may include positioning data from a GPS source, e.g., a GPS device integrated into a mobile phone, smartwatch or other wearable, tablet PC or the like. If location sharing is on, then the system may perform background polling for GPS coordinates, such as every few seconds (e.g., every 1-10 seconds). If sharing permissions are only when the app is open, then the GPS coordinates may only be received when the app is in the foreground (actively being used). And if there are no sharing permissions enabled, then GPS coordinates will not be shared. Other client device sensor information may include received signal strength information (RSSI) associated with WiFi signals or even ad hoc connections such as Bluetooth. In the case of WiFi signals, knowing which WiFi access points, repeaters or other devices are detectable by the client device and the relative signal strength can aid in determining how close the client device is to those devices. Similarly, knowing which Bluetooth devices are nearby can also help pinpoint the client device∝s location, especially if those Bluetooth devices are static (e.g., a wireless printer). By way of example, the system could use all such information to create a heat map or overlay of a geographical location, comparing the GPS coordinate information, RSSI information, other "visible" WiFi or Bluetooth devices to identify one or more likely spots where the client device could be. In one example, the vehicle may receive updated location or other information from the rider's client device every few seconds (e.g., every 1-5 seconds, or more or less). The refresh rate for receiving updated location information may be changed depending on the pickup status. For example, when the time is within 1-2 minutes of the scheduled pickup, the refresh rate could be increased to one or more times per second, whereas if the time is more than 5 minutes from the scheduled pickup, the refresh rate may be at a lower (e.g., default) rate of every 2-10 seconds (or more or less).

In addition to GPS information received from the rider's client device, the vehicle may also use location information from its onboard positioning system (e.g., 234 in FIG. 2). For instance, the vehicle's GPS receiver or other location systems can be used to determine the vehicle's latitude, longitude and/or altitude position. This information could be leveraged, such as by comparing the satellites detected by the rider's device with the satellites detected by the vehicle's GPS system. Having a common set (or subset) of satellites may indicate that the vehicle and the rider are positioned on the same side of the street. Or, conversely, the lack of overlapping satellites in the set could indicate that the rider is on the opposite side of the street or that some intervening obstruction is causing the two GPS modules to detect different satellites. In addition or alternatively, if the rider has multiple devices that each includes a GPS or other location module, information from each device could be used to refine the rider's location estimate (e.g., by averaging the locations from each module, or ranking the locations and selecting a most likely one). As a result, this information could be used to narrow the list of possible pedestrian candidates from a list of possible candidates detected by the vehicle's perception system.

As noted above, vehicle sources may include devices from the perception system and/or the positioning system. For instance, as discussed with regard to vehicle 100 of FIG. 1A and the diagram of FIG. 2, sensors of the perception system may include radar units, lidar units, cameras and acoustical sensors. The radar, lidar and/or cameras may each have a different field of view (e.g., a given camera may have a 45°-135° field of view along the front, side or rear of the vehicle, while a rotating lidar unit on the upper section of the roof pod 102 of FIG. 1A may have a 360° field of view), operating range (e.g., short range lidar configured to detect objects within 10-25 meters of the vehicle, long range lidar configured to detect objects beyond 15-20 meters and up to 100-250 meters, radar configured to detect objects 100-200 meters away or more, and high resolution cameras configured to detect pedestrian and signage at distances greater than 500 meters).

As shown in the bottom view 500 of FIG. 5, the roof pod assembly (102 in FIG. 1A) may include one or more sets of microphones 502. In particular, the bottom surface of the base section of the roof pod assembly may include locations for receptacles where microphones or other transducers 502 may be disposed. In one example, at least 3 or 4 locations, each having a pair of transducers (e.g., for localized noise cancellation), are employed in an acoustical system. Microphones or other transducers may be positioned along other parts of the vehicle. For directional microphones or other transducers, the system may have a higher confidence in the directionality and/or distance based on the relative orientation (e.g., parallel v. perpendicular). The transducers may be configured to detect sounds in a typical range of human hearing such as from 20 Hz to 20 KHz. The transducers may also be configured to detect sounds outside of this typical range, such as frequencies below 20 Hz (e.g., down to 1-15 Hz) or ultrasonic frequencies above 20 KHz (e.g., between 20 KHz-30 KHz).

This acoustical subsystem may be able to provide a certain amount of directional information for sounds detected in the vicinity of the vehicle. For instance, if the rider's device plays a tone or a short melody, the subsystem may detect which direction (bearing) it came from relative to the position and orientation (pose) of the vehicle along a roadway. Or the rider may be speaking to remote assistance personnel via an app, such as to get assistance locating the vehicle or the pickup location. By way of example, the subsystem may be able to detect that the sound came from a bearing in the range of 120°-140° relative to the front of the vehicle. A distance from the source of the sound to the vehicle may also be estimated, for instance if the rider's device communicates the volume of sound to the vehicle (e.g., either the sound level emitted when the tone or melody is played, or the sound level detected when the person is speaking to remote assistance). Here, knowing the loudness of the sound at the rider's device and the loudness of the detected sound, the vehicle's system may estimate the approximate distance according to a sound distance attenuation calculation (e.g., within 25 meters, between 25-5 meters, beyond 50 meters, etc.). Knowing an estimated bearing and distance from the microphones or other transducers, the system may use this to focus in on one or more pedestrian objects detected by the other onboard sensors. In another example, the rider's phone may ping or emits a signal that the vehicle's acoustical subsystem detects and then echo's back, which can be used to indicate to the rider how close they are to the vehicle based on the time it takes for the ping and echo process to occur. This information can be communicated to the rider via tactile information such as one or more haptic patterns, etc. The ping and echo tones can be ultrasonic rather than within the range of human hearing. The length or pattern of 'tone' can be used to inform the rider how far/close they might be to the vehicle (or the pickup location). In combination with imagery detected by one or more cameras on the vehicle, such a ping/echo approach with feedback may help to further pinpoint and direct the rider towards the vehicle.

The communication system (e.g., 200 in FIG. 2) may also provide additional sources based on Bluetooth, WiFi and/or cellular information detected by the vehicle. For instance, Bluetooth and WiFi RF signals may have an effective range of meters to several hundred meters, while cellular signals may have an effective range on the order of kilometers or more from the base station or gNodeB. In the case of a Bluetooth or other ad hoc type of connection, once a connection has been established between the rider's device and the vehicle, signal strength information (from the rider's device and/or the vehicle) can help in refining the location estimate for the rider. Alternatively or additionally, the presence of other Bluetooth or WiFi enabled devices detected by the rider's device may be shared with the vehicle. Here, the vehicle's system may compare the list of such devices with its own detected device list. If there are devices in common on each list, this can further narrow down the likely position of the rider's device, especially when the devices on the list have a known location. A similar evaluation could be performed for cellular signals, for instance by comparing which base stations/gNodeBs (or sectors of those devices) are on the lists. These analyses may be performed with or without considering signal strength information.

Figure 6A:
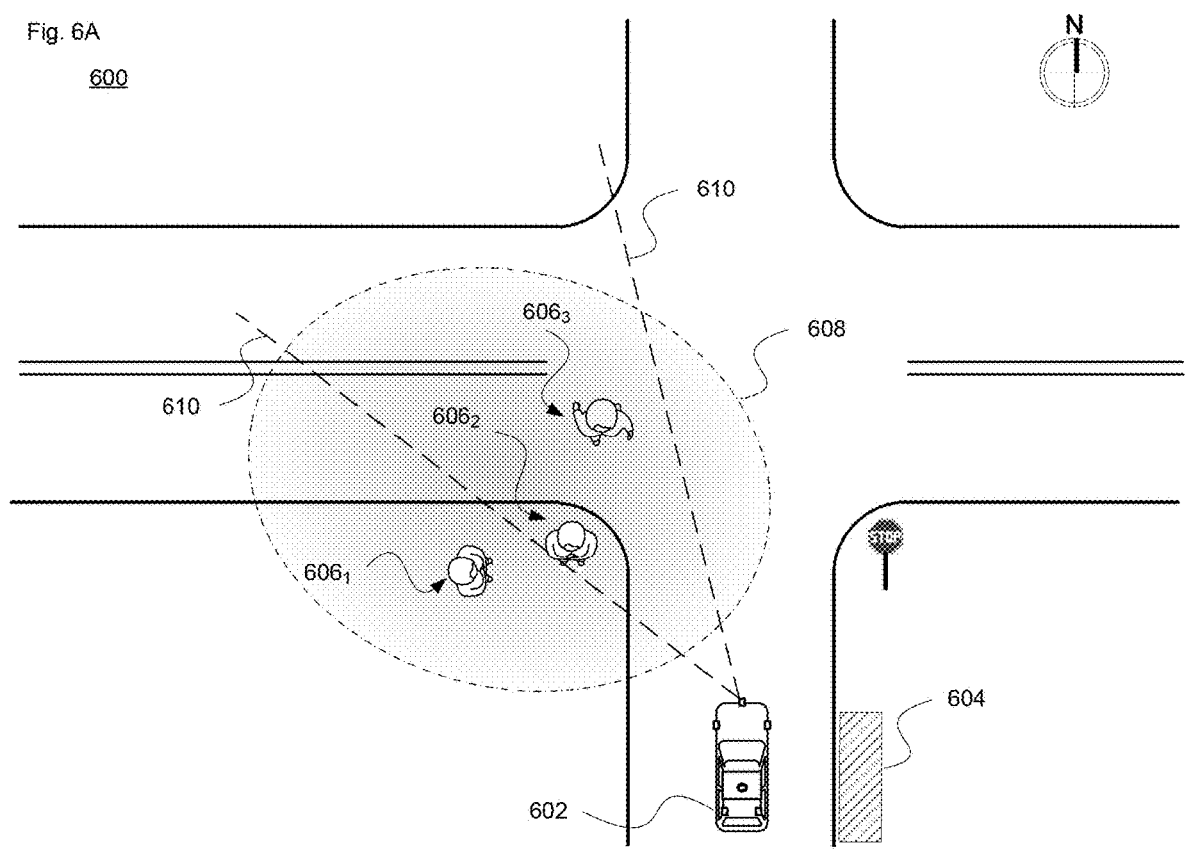
FIGS. 6A-B illustrate examples for rider pickups in accordance with aspects of the technology.

In combination, such obtained or detected information may be used to identify a specific person in the environment who is highly likely to be the rider, or to eliminate other pedestrians from a list of potential riders. For instance, FIG. 6A shows an example scene 600, in which vehicle 602 has arrived at pickup location 604. In this example, three objects in the nearby environment have been identified as pedestrians, namely pedestrian objects $606_1$, $606_2$ and $606_3$. Based on location information provided by the rider's client device, dashed area 608 indicates a zone within which the rider is likely to be, e.g., with a 95% likelihood. However, this zone encompasses all three pedestrian objects detected by the vehicle's perception system. Using one or more pieces of information from the vehicle's systems as discussed above, the vehicle may determine that the rider is within an area bounded by the straight dashed lines 610. This enables the system to eliminate pedestrian object $606_1$ as the rider to be picked up. Other information may be used to further refine the list of possible riders or otherwise identify a single rider candidate with the highest confidence value. This can include a triangulation-type approach, where each different source of information can be used to narrow down the area in which the rider could be. Note that in different situations it may not be necessary to know exactly which of the pedestrians is the rider, as long as there is a determination that the rider is one of a specific set of pedestrians. For instance, walking directions are still helpful even when the rider is part of a cluster of people moving in the same direction. Also, the vehicle may perform a modified pullover behavior, or even proximity unlock, when it knows where the rider is regardless of identifying exactly which person in the cluster is the rider.

One aspect of the technology may use Bluetooth signals for wayfinding. For instance, given a determined location of the vehicle and beacon signals emitted from the vehicle that are detected by the rider's device (including RSSI information), trilateration may be employed to calculate the current position of the client device. This can provide an estimate of the rider's position on the order of 1-10 meters. Another aspect of the technology may use ultrawideband RF signals for location refinement. An ultrawideband approach does not rely on RSSI, which has a coarse understanding of location (on the order of a few meters or more). Instead, a system using ultrawideband signals computes distance using time-of-flight information. This approach can be accurate to roughly 50 cm when the rider is in the 1-50 meter range from the vehicle. While using an ultrawideband approach may use a relatively high amount of power, it could be used sparingly at specific times to get the higher accuracy location information. By way of example, the system could use a layered approach that employs GPS location from the rider's device for a general location estimate, and then employs ultrawideband and/or Bluetooth techniques once the rider is estimated to be within some threshold distance of the vehicle or the pickup location.

For example, another aspect of the technology to identifying the correct rider with a high degree of certainty (e.g., above 80-90% certainty) involves historical information and behavior prediction. As noted above, pedestrian object characteristics may be input into a behavior prediction module of the vehicle's behavior modeling system. The behavior modeling system uses various behavior models that are based on object type to output one or more predicted future behaviors for a detected object. With regard to pedestrians, object trajectories may be a list of positions and orientations or headings (e.g., poses) of people walking in the scene, as well as other predicted characteristics such as speed. According to one example, input could include pedestrian behavior in response to communications to their phone or other device. For example, if the vehicle sends audio or visual communications to the rider's phone and a pedestrian gestures or adjusts glance/gaze to their device, that could be one contributing input to determining whether they are the rider. Thus, in one aspect, the system may model head gaze behavior for pickup with behavior prediction of approach. For instance, pedestrians at corners who are turning their heads actively back and forth multiple times may be considered to be looking to cross or engage with traffic behavior. Here, knowing the pose of pedestrians, heading and "keypoints" that indicate posture and motion as well can be useful indicators. Modeling such "my ride is here" behavior may be indicators (combined with other signals) of the rider. In addition, if the rider is riding with family member that require gear, e.g., a child seat, booster seat, stroller, etc., then pedestrian with those objects may be likely candidates.

Historical Information and Behavior Prediction

The more robust the historical information for a given pedestrian object, the more likely it is that the behavior prediction for short-term actions (e.g., in the next 5-10 seconds) will be accurate. This can include evaluating all nearby detected pedestrian objects, as well as using contextual information about the rider. In one example, knowing where rider first hailed the trip could be used to determine whether someone is walking from that direction. For instance, this can include using a street address or geolocation coordinates to determine where the person would have walked out of a building. The vehicle may maintain historical information on a rolling (e.g., first-in, first-out) basis for 10 seconds, 30 seconds, 60 seconds or more. Alternatively, it may maintain historical information for objects within some threshold distance (e.g., 100-250 meters) of the vehicle. How long or how far the historical information is maintained could vary for different object types. Thus, because pedestrian objects tend to move slower than bicycle objects or vehicle objects, the system may maintain historical information for such slower moving objects longer during a pickup scenario.

In a situation where the trip was scheduled from a place nearby the pickup location, e.g., from a mall, office building or apartment building within 2-3 blocks or within 250 meters of the pickup location, the system could determine an expected walking path of the rider from the location where it was scheduled to the selected pickup location. This expected walking path could be derived based on roadgraph or other highly detailed map information that indicates where sidewalks, crosswalks, streetlights and street signs, static obstacles (e g, mailboxes or covered bus waiting spots) are located. It could also be based on whether there are different access (e.g., egress) points for the building. Multiple paths could also be created depending on the number of likely routes that could be traversed (e.g., cutting across a grassy area instead of taking a longer route around a corner). Each expected walking path could be ranked from most to least likely. This ranking could be refined based on current scene conditions. For instance, a delivery truck may be parked in front of a crosswalk, so a different walking path that avoids the crosswalk may be ranked higher. Here, the vehicle's processing system could compare the expected walking path(s) against the historical information for the detected pedestrian objects.

When considering access points, the system may evaluate not just raw location information, but the most likely access point and what would the trajectory be from that access point. In addition or alternatively, the system could temporarily maintain historical GPS or other location information from the rider's client device, such as the last 30 seconds or 2 minutes' worth of location information. This location information may be limited to data to get a general approximation of the location (e.g., just the first standard deviation's worth of location data).

In one scenario, this information from the rider's device may only be requested when it is determined that the rider is within a certain range (e.g., either distance in meters or time in seconds or minutes) from the pickup location, or when the vehicle detects from its sensor data that there is a sufficient likelihood that the rider is in the area. In another scenario, the information may be requested from the rider's device within some timeframe prior to the planned pickup time, e.g., within 1-3 minutes of the pickup. Here, for a vehicle that has already arrived or is imminently arriving at the pickup location (e.g., in the next 30-60 seconds), receiving location-related information from the rider's device prior to the rider's arrival could be used to focus sensors of the vehicle's perception system on a particular area, so that the rider can be quickly identified once they arrive on the scene.

There is no need to receive "stale" information, such as location data from 10 minutes prior, as that would not be useful when predicting the rider's walking path or behavior. Thus, the vehicle may request the rider's device to only send location information or other relevant data from a specific timeframe (e.g., the last 20-30 seconds). The obtained information could be compared to the expected walking path(s) or at least a segment of the path(s), such as a 25-100 meter segment, as this could increase the confidence level of the person's actual path towards the pickup location.

Figure 6B:
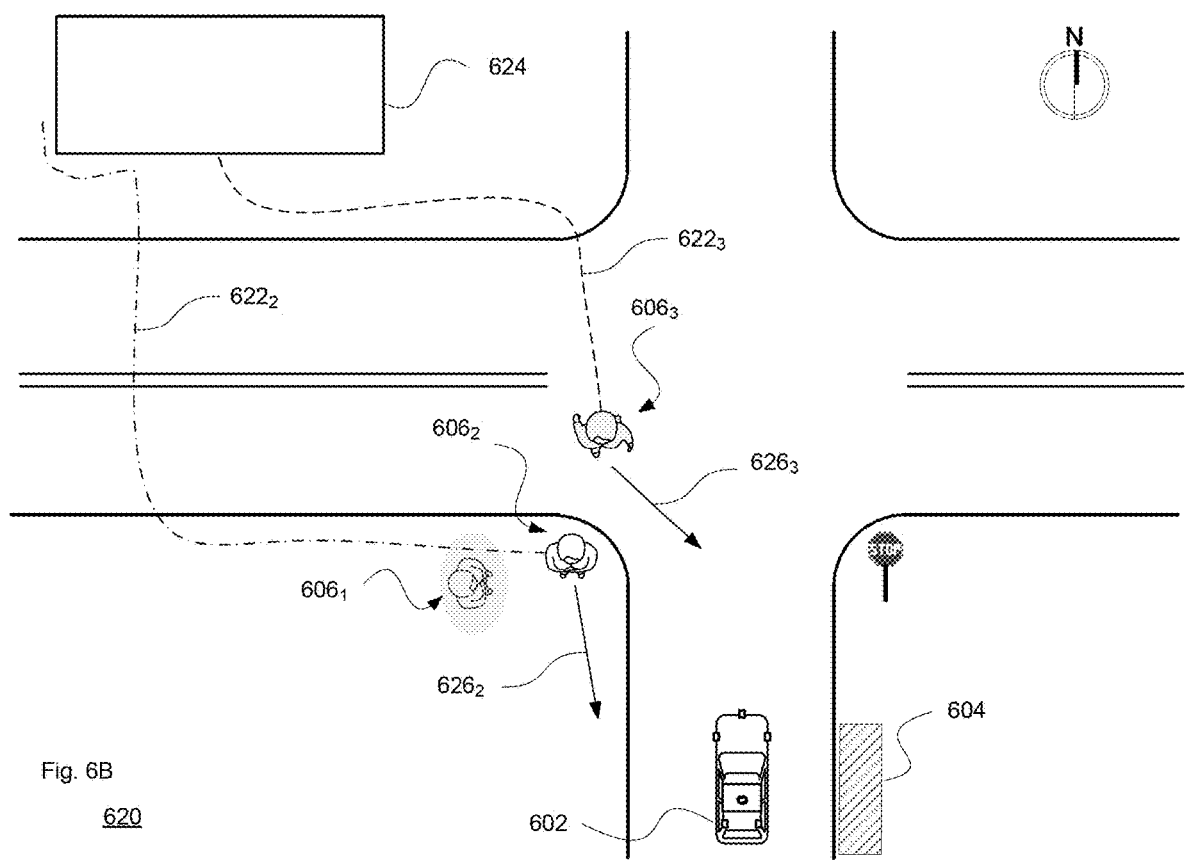

FIG. 6B illustrates a view 620 based on the scenario in FIG. 6A. Here, pedestrian object $606_1$ has been eliminated as a candidate to be the rider, and so is shown being greyed out to indicate the elimination. The remaining candidates are pedestrian objects $606_2$ and $606_3$. In this example, pedestrian object $606_2$ has a walking path $622_2$ and pedestrian object $606_3$ has a walking path $622_3$ (with the walking path of pedestrian object $606_1$ not being relevant any longer). These predicted walking paths may be based on the historical information and the likely access point from which each pedestrian object may have exited building 624.

As part of the behavior prediction, the vehicle's sensors may detect the current gaze direction of the likely pedestrian object candidates. This may not be possible if someone is wearing sunglasses or prescription glasses, which may affect the ability of the camera sensor(s) to identify the gaze direction. However, if the gaze direction is determined to be looking towards the vehicle or the pickup location when the person is within some threshold distance of the vehicle or the location (e.g., within 10-15 meters, or more or less), then the system may increase a confidence score that that pedestrian object is likely the rider.

Other information based on the scheduled ride may provide additional contextual cues as to which person could be the rider. For instance, when the ride was scheduled, the person may have indicated that they wanted a particular type of vehicle (e.g., a minivan), or that they needed access to the trunk or other storage compartment. Thus, if one pedestrian object in the list of candidates is detected to be pushing a stroller, walking with a service animal, or using a rollator, then the system may determine that that person is more likely to be the rider than other candidates in the list.

Based on the available historical information and real-time sensor information of the scene in the vehicle's environment, the system can predict how each pedestrian object of interest will move over the next few seconds (e.g., next 2-10 seconds). Thus, as shown in FIG. 6B, pedestrian object $606_2$ has a predicted path $626_2$ and pedestrian object $606_3$ has a predicted path $626_3$. As shown in this example, the predicted path $626_3$ of pedestrian object $606_3$ is moving toward the pickup location 604, while the predicted path $626_2$ of pedestrian object $606_2$ is moving down the sidewalk opposite to the pickup location 604. Furthermore, someone walking off the curb in the middle of the street, straight towards the vehicle and not near crosswalks would be a good example of a situation in which the behavior prediction might lead the person to the vehicle's door.

In addition to using information from the rider's client device(s) and the vehicle, information from other vehicles in the fleet and/or from other sources could be employed in the approaches described above. For instance, another fleet vehicle may have driven along the same segment of roadway very recently, such as in the last 10-30 seconds. Information from that vehicle's perception system could be used to enhance the information obtained by the vehicle assigned to pick up the rider. This can include identifying different pedestrian objects (objects in the environment determined by the system to have a high probability to be pedestrians) and determining if there are any pedestrian objects detected by the other vehicle which may be near or approaching the pickup location. This could be used to help in situations where the pickup vehicle is occluded from one or more pedestrian objects, for instance because a truck is parked on the side of the road, or there are other people standing in front of the rider at an intersection. Here, another fleet vehicle traveling in the same direction, the opposite direction, or passing through the same area (e.g., driving along a cross street at an intersection) may have an unoccluded view from its lidar sensors, cameras or other sensors. Sensor information from the other vehicle(s) could be used to supplement the data from the vehicle's own sensor system, for instance to effectively increase the vehicle sensors' field of view.

Figure 7:
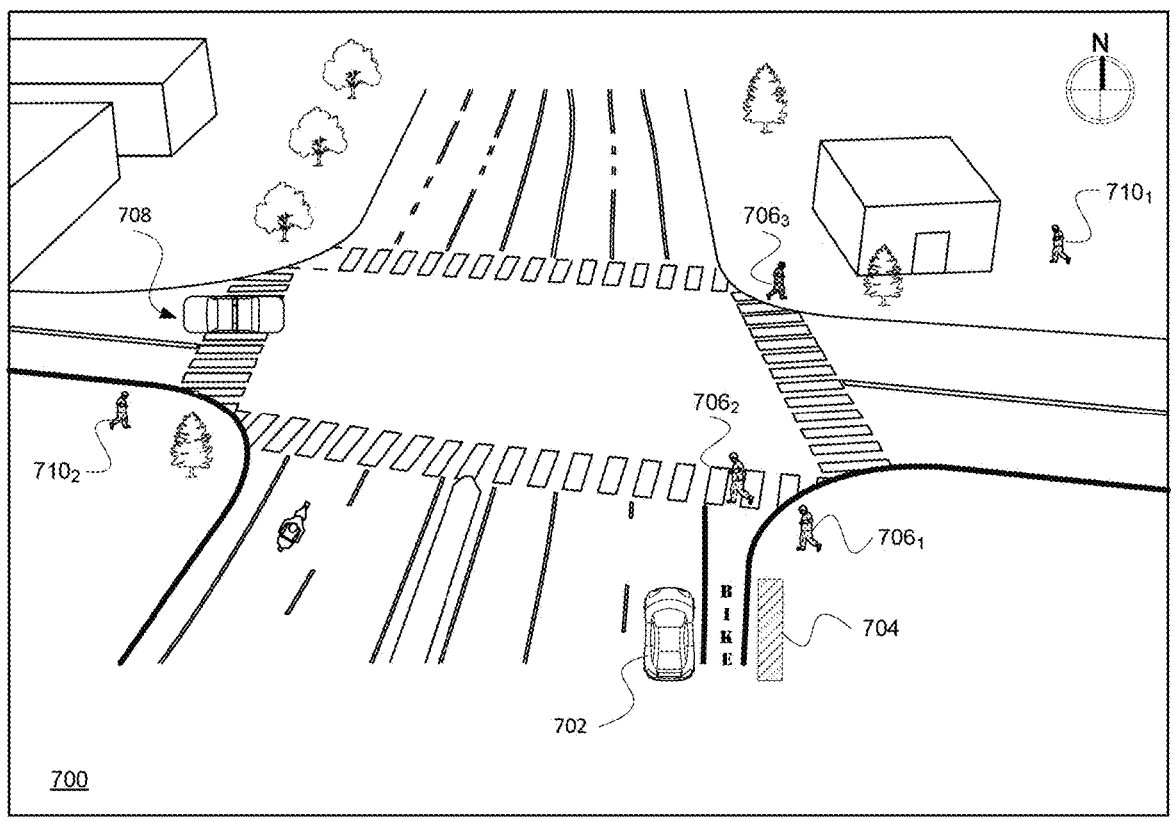
FIG. 7 illustrates another example for a rider pickup in accordance with aspects of the technology.

FIG. 7 illustrates an example 700 of this type of situation. As shown, vehicle 702 has arrived at pickup location 704 facing northbound on a first road segment. The perception system of vehicle 702 detects a number of pedestrian objects $706_1 \ldots 706_3$. In this example there are other people in the scene that were not identified as pedestrian objects, for instance because they have been occluded from the sensors of the vehicle 704. Here, another vehicle 708 of the fleet has just passed through the intersection traveling westbound. In this case, the other vehicle 708 detected pedestrian objects $710_1$ and $710_2$ as it drove by. Information about these pedestrian objects may be transmitted to the vehicle 702. This can include the last known location of those objects, historical information about their walking paths, any predicted paths generated by the vehicle 708, etc. The vehicle 702 could then use this information to update its list of pedestrian objects as possible rides or otherwise make any necessary pickup-related adjustments.

Pickup Location Adjustment and Example Situations

In certain situations, the rider, the vehicle or the ride hailing service may adjust the pickup location prior to the rider entering the vehicle. For instance, this may be done because another vehicle is parked in or blocking the initially selected pickup location. Or it may be more convenient to pick up the rider on the other side of the street, around the corner, etc. in order to reduce the walking distance to the vehicle, avoid traffic congestion, etc. Upon adjustment of the pickup location, the system could update the expected walking path of the rider to the adjusted pickup location. Here, the timing of the adjustment could be compared against the behavior of any pedestrian object in the list of likely rider candidates to see if a particular pedestrian object is detected to change its walking direction or otherwise move towards the adjusted pickup location.

There may be particular situations in which it is particularly challenging to identify whether a particular pedestrian object detected by the vehicle's perception system is the rider. By way of example, a pullover scheduled for a location near a parking lot could involve detection of many different people walking towards the parking lot on their way to their own vehicles. Here, the vehicle or the ride hailing service may initiate an adjustment to the pickup location, such as when the vehicle detects that there are more than a certain amount of vehicles parked in the parking lot (e.g., more than 3-5 cars, or when it is estimated that the lot is more than 15-30% full).

In other situations, there may be multiple riders which may arrive at the pickup location together (e.g., a family with children or business colleagues heading to a client meeting) or separately (e.g., friends meeting up to head out to dinner, a concert or sporting event). In the former case, knowing how many riders are scheduled for a multi-passenger trip can be used by the vehicle, such as by identifying a group of pedestrian objects generally moving in the same direction at approximately the same pace. For example, if there is a four-person trip, should the vehicle's perception system identify a set of four pedestrian objects moving toward the pickup location, it could assign a very high likelihood to the group (e.g., 90-95% likelihood) that that group is the set of riders to be picked up. In such a situation, the likelihood may be rated as very high even without receiving any location-related information from the riders' client devices, fleet sources or other sources. In the latter case, the various pedestrian objects detected in the scene could be evaluated to see whether some of them are converging towards the pickup location, the vehicle's current location, or some other location. Here, for instance, the friends may meet up at some intermediate location, such as at the corner of an intersection, before heading to the pickup location or the vehicle's current location. Determining whether multiple pedestrian objects are converging can be used to adjust the likelihood that each of those objects is one of the riders to be picked up, and the vehicle's system may update its list of possible rider candidates accordingly.

Training a Pedestrian Object Model

Machine learning models for pedestrian objects, which may include neural networks, can be trained on "ground truth" data associated with a pickup location, geolocation data of a rider, perception information from a vehicle (or a fleet of vehicles) and/or the vehicle location itself. This may be done for different types of pickup scenarios, both with and without other nearby objects (e.g., cars or other vehicles on the roadway, pedestrians or bicyclists on sidewalks, etc.). The training may be based on gathered real-world data (e.g., that is labeled according to road environment, intersection type, the presence of sidewalks, signage such as stop or yield signs, etc.). From this, one or more models may be developed and used in real-time by the self-driving vehicles, after the fact (e.g., post-processing) evaluation by a back-end system, or both. This can include a rider or customer localization model for detected pedestrian objects that is used to refine an estimated position of the rider in a particular geographic area. By way of example, the model structure may be a deep net, where the exact structure and parameters can be searched through automated machine learning, e.g., using a Neural Architecture Search (NAS) type model. Based on this, the onboard system (e.g., planner system, routing system and/or the behavior system of the vehicle's autonomous driving system) can utilize the model(s) to evaluate detected pedestrian objects and handle pickup (and drop-off) situations accordingly. This can include creating a likelihood across all detected or identified pedestrian objects that each such object is the rider to be picked up.

In one approach, the system can use historical location data for each pedestrian object (e.g., the last 20-30 seconds of GPS location coordinates) in a Bayesian calculation (e.g., maximum a posteriori or MAP), to create a likelihood across all pedestrian objects. As noted above, the location information from the rider's client device may not be exact, so the historical information (e.g., collected every 1-5 seconds) can be a sequence of noisy location datapoints. In order to train the pedestrian object (localization) model to achieve a high likelihood that a given pedestrian object is the rider to be picked up, the training inputs may include different sets of ground truth data in addition to the rider's geolocation information. These other sets can include the selected pickup location or any adjusted pickup location, the vehicle's location at one or more points in time prior to or at pickup, perception information about the region around the pickup location (e.g., from lidar, camera, radar, acoustical and/or other sensors of a vehicle's perception system), supplemental sensor-related information from fleet vehicles, other sensor or location information associated with the pickup location, etc. The training data may also include highly detailed map information such as roadgraph data, which may indicate other objects in the scene that could affect a pedestrian's movement (e.g., a mailbox in their way, or a stop light, walk light or Pedestrian Hybrid Beacon that may regulate when pedestrians can cross an intersection or crosswalk). The model can be trained with any combination of such information.

Once the model is trained, it can be used by the vehicle or the backend system in different ways. For example, the vehicle may use the model to predict how each pedestrian object of interest will move over the next few seconds (e.g., the next 2-10 seconds), such as by generating a set of one or more predicted paths for each pedestrian object of interest. Here, given the path observed by the perception system, the vehicle could determine what the trajectory would be for that pedestrian object. This can include generating a likelihood value or composite score that the person associated with that pedestrian object would walk to the car (e.g., a percentage value or a ranking on a scale such as 0-4). Objects with scores falling below a threshold could be discarded from the set of likely rider objects. Objects with scores exceeding the threshold could be focused on, such as by requesting additional information from the rider's device, to help further narrow the list possible rider objects.

The vehicle or the backend system may also use the model to perform a back evaluation, matching the geolocation information to a most likely path. Here, knowing where a given pedestrian object is at a specific location in time, the system may work backwards to determine where that object came from. If this process indicates that the object came from the place where the trip was requested, it is an indication that the given pedestrian object is the rider. The back evaluation approach can also be used to identify how accurate the geolocation information is which is received from the rider's device. Highly accurate information (e.g., within 1-2 meters or less) may provide a higher confidence in the location of the rider than less accurate information (e.g., on the order of 10-20 meters). Also, given a pedestrian object's past, how likely are they to get into the vehicle, conditioned on the GPs signals or not, depending on if that information is available. This can be useful when someone is standing near the curb in the middle of a street without a crosswalk, for instance.

User Experience

Based on the above approaches, the system may achieve a high confidence that a given person in the scene is the rider. By way of example, this confidence level could indicate that there is a probability exceeding 85%-90% that a particular person is the one to be picked up for a scheduled ride (or that a group of people are the ones to be picked up). Using this enhanced confidence, the vehicle or the back-end system of an autonomous vehicle ride hailing service may make changes to the pickup or provide useful information to the rider(s) or others nearby, which can improve the overall user experience.

Proximity Unlocking

Proximity unlocking is a feature that can be reassuring to the intended rider. Here, knowing which person is the rider, the vehicle may wait to unlock one or more doors until that person is within a threshold proximity of the vehicle. By way of example, depending on the vehicle type and the pickup location, the door(s) may be unlocked once the person is within 1-2 meters of the vehicle. Alternatively, the door(s) may be unlocked or a sliding door of a minivan opened when the vehicle detects that the person is reaching for a door handle or taking some other action to indicate that they are preparing to enter the vehicle (e.g., putting down a package or folding up a portable bike). Here, a close-in camera (or lidar, radar or acoustical) sensor of the perception system may be arranged to detect objects within 2-3 meters of the vehicle.

When the door(s) is unlocked or opened could be adjusted by the vehicle depending on how many other people are around the vehicle. For instance, the more crowded it is, the closer the person would have to be to unlock the door. There may be time of day considerations that allow the vehicle to vary when to open the door. A late night pickup may involve the doors opening when the person is reaching for the handle, whereas a morning pickup may involve opening the door a few seconds prior to the person getting to the vehicle. Knowing that the vehicle has been locked and inaccessible to others before the rider gets to it can give the rider a safe and secure feeling because they are not getting into a car that might have been unlocked for a while.

In one scenario, the system may communicate to the rider (e.g., via an app on the rider's mobile device) to press a button on the device before unlocking. In another scenario, the vehicle need not unlock all of the doors. Instead, knowing which person the rider is, and which side of the vehicle they are walking towards, allows the vehicle to select which side's door(s) to unlock/open. In yet another scenario, the vehicle may cause interior and/or exterior lighting to illuminate in conjunction with the door(s) unlocking. And in a further scenario, weather conditions may be a factor used by the vehicle to decide on when to open a door. For instance, instead of opening a sliding door 10 seconds before the person arrives, if the ambient temperature is below some threshold (e.g., below 50° F.), the door may remain closed until the person is 2 seconds away in order for the interior to remain warm (e.g., on the order of 70° F.). In contrast, if there is heavy rain, the door may open earlier, e.g., 4-6 seconds before the person arrives, so that they may enter the vehicle without getting too wet. Furthermore, knowing which side the rider is approaching from can be beneficial so that the vehicle communicates to them in a targeted way that the door they're about to open is unlocked or is being unlocked. Rider awareness of the unlocking timing and locked state is meaningful for communicating security in addition to ensuring security. In some scenarios it may not be suitable to broadcast the unlocked status widely, or it can be helpful to show on the side opposite the rider that the door is locked to deter non-riders.

Pickup Location Adjustment/Early Boarding

Knowing which pedestrian object is associated with the rider allows the vehicle to determine whether to adjust the selected pickup location. For instance, if the rider is determined to already be at the pickup location when the vehicle arrives on scene, no adjustment may be necessary assuming that there is space for the vehicle to pull over. However, when the person is not quite at the pickup location, the vehicle may determine that it would be better to perform an early boarding operation by pulling up 50 meters beyond the pickup location and sending the rider a notification of the adjusted pickup location. This would avoid the rider having to walk the extra 50 meters unnecessarily.

Another aspect of this approach could involve changing the amount of time that the vehicle will wait at a pickup location. Here, knowing that the rider is not close to the location (e.g., more than 400 meters from the pickup spot), the vehicle may change from a default wait time (e.g., 2 minutes or more or less) to a longer wait time (e.g., 5 minutes or more). Alternatively, the vehicle may move to a different spot so that it can wait longer, for instance when the initial pickup spot is in an area with limits on idling.

In another scenario, if there is a pedestrian nearby and the vehicle determines that they are not the rider and just crossing the street, the planner could cause the vehicle to not proceed while it waits for the pedestrian to continue walking. However, using the above techniques, the vehicle may determine that the pedestrian is actually the rider and that they are just walking to the other side of the vehicle to enter it. Here, the vehicle would be able to use this information to switch to the proper boarding state, such as performing a proximity unlocking operation.

Gesturing

There may be crowded situations, such as at rush hour, when a concert or sporting event lets out, etc., where there are a number of other people very close to the rider. In this type of situation, just understanding if the rider is part of a cluster of people is useful to gauge how close they are to the pickup spot or to the vehicle. Here, if the vehicle detects a group of pedestrian objects all within a few meters of one another, the vehicle could request a gesture by the rider to signal to the vehicle, which would allow the vehicle to confirm that they are part of the group. This request could be done via an app on the client device. Similarly, the vehicle could select different ways for the rider to signal their location, such as by having the client device play a melody or other sound, or turn its flashlight on and off.

Communicating to the Rider and Other People

Having a very high confidence in knowing which detected pedestrian object is the rider (or riders) enables the vehicle to provide enhanced information to the rider, which can speed up boarding, reduce frustration with waiting, or otherwise make the pickup more enjoyable. As noted above, if the rider is not quite at the pickup location, the vehicle may change the protocol of pickup, encouraging the rider to board faster by modifying the pickup location to a place closer to where they currently are. Or if the rider is not close, then the vehicle may circle the block if it would need to block traffic while waiting. Either way, the vehicle may send one or more notifications to the rider about the ride, such as an adjustment to the pickup location, where the vehicle currently is or plans to be, how best to enter the vehicle, etc.

The vehicle may customize user messaging based on whether the system determines that the rider is close or not close. By way of example, if the rider is far from the pickup location (e.g., more than 300 meters or more than 3 minutes away), the vehicle may send a message indicating when they expect the rider to arrive or how long the vehicle may be able to wait at the selected pickup location, or offer the option to reschedule where the vehicle can then determine to go ahead and circle (as opposed to unnecessarily waiting at the spot while blocking traffic). However, if the rider is close (e.g., within 25 meters), the message may indicate that the vehicle is very close and ready for them to board.

In addition, the timing for when to send information to the rider may vary depending on the distance they are from the vehicle. Here, the closer the person gets, the more frequent the messages may become. Alternatively, the closer the person gets, the more specific the messages become. This can include providing more granular walking or turn-by-turn directions, identifying landmarks along the path or objects in the way (e.g., "turn left at the barbershop pole" or "watch out for the broken sidewalk in 20 feet"), details about the vehicle (e.g., "the blue minivan"), etc. For instance, when the rider is 100 meters away, the vehicle may communicate that they should be there in under 2 minutes after walking straight another 2 blocks. And when the rider is within 20 meters or on the same block as the vehicle, the vehicle may select a message that indicates exactly where it can be found (e.g., "Waiting behind the red SUV about 10 meters from you to the left"). Or the vehicle may send audio, imagery or a short video showing the vehicle or where it is relative to the rider, or otherwise indicating to the rider how to get to the vehicle (which could involve haptic feedback on the rider's device to indicate a direction to walk along. Thus, while the vehicle may have a default set of messages and/or default timing for when to send those messages to the rider, the vehicle is able to modify the messaging and/or timing based on real-time conditions at the pickup location.

Thus, the vehicle may communicate with the rider about modifying their walking path, such as to avoid an obstacle or a crowd of people. The app user interface on the rider's device may present information (e.g., images or a video) from the rider's perspective (what the person walking to the pickup location would see) or from the vehicle's perspective, with the latter case being helpful to give the rider a different viewpoint to aid in getting them to the vehicle. The user interface could include captioning, highlighting or audible information to explain what is being shown. In one example, instead of a pin on a map, there could be an audio description ("I'm parked near the large bush or double parked next to the tan sedan"). This could alternatively be done via chat as well, such as employing a chatbot with the rider that leverages data between the vehicle and client data to inform the rider of the location. In another example, the system could suggest a starting point for walking directions to the rider, or suggest one or more interim points for walking direction. These could include locations/waypoints for the person to pass through to more easily reach the pickup location.

It is also possible for the vehicle to communicate with people other than the rider. Sometimes it may be helpful to others nearby to communicate with them. For instance, if someone who is determined not to be the rider approaches the vehicle, the vehicle may provide an audible and/or visual notification to them that the vehicle is waiting for someone else. Here, the vehicle may remain locked until the designated rider arrives. Communicating with non-riders could include presenting them with targeted messaging. At the same time, the vehicle may also provide information to the actual rider, such as boarding information displayed towards the rider but not towards other people around the vehicle.

As noted above, in some situations there may be multiple riders that will travel together but come separately. Here, the vehicle (or back-end ridesharing system) may provide individualized information to each rider. This can include separate walking or turn-by-turn directions. It can also include suggesting a location for some or all of the people in the party to meet up before arriving at the pickup location. For instance, the vehicle may suggest that each rider meet at a particular corner of an intersection so that they can all walk down the street together and enter on one side of the vehicle.

Rider Support

Sometimes there may be situations where more assistance is needed by the rider than can be provided by the vehicle. For instance, the ridesharing service can provide rider support via its back-end system. Here, human support personnel may be able to access imagery or a video feed from the vehicle to help locate the rider, or even access imagery taken by the rider's device. Here, the imagery from the client device may be used to help localize the rider, such as by comparing the obtained imagery against stored imagery of that particular area. This can be done by the back-end system with or without the rider support personnel.

Rider support can involve the support member asking the rider to perform a gesture (e.g., "please raise your left hand") or move in a certain way ("please face left and look towards the blue minivan"). The person may request rider support via the app on their device. Or if the vehicle determines that the person is having difficulty finding the vehicle or the pickup location, it may send a rider support request to the back-end system.

Direct Communication

In another scenario, once the rider is close to the vehicle, the system may enable direct communication between the rider's client device and the vehicle's onboard communication system without routing information via a back-end ridesharing service, such as via an ad hoc communication link (e.g., Bluetooth), a WiFi link, or a cellular communication connection. This can reduce possible communication delays that may occur when routing via the back-end system. The direct communication could include telling the rider that their vehicle is pulling next to the red car in the parking lot, or request the client device to take some action (e.g., flash a light or make a sound) to allow the vehicle's sensors to identify where the person currently is with an extremely high degree of localization (e.g., to within 1-3 meters).

Example System Architecture

Figure 8A:
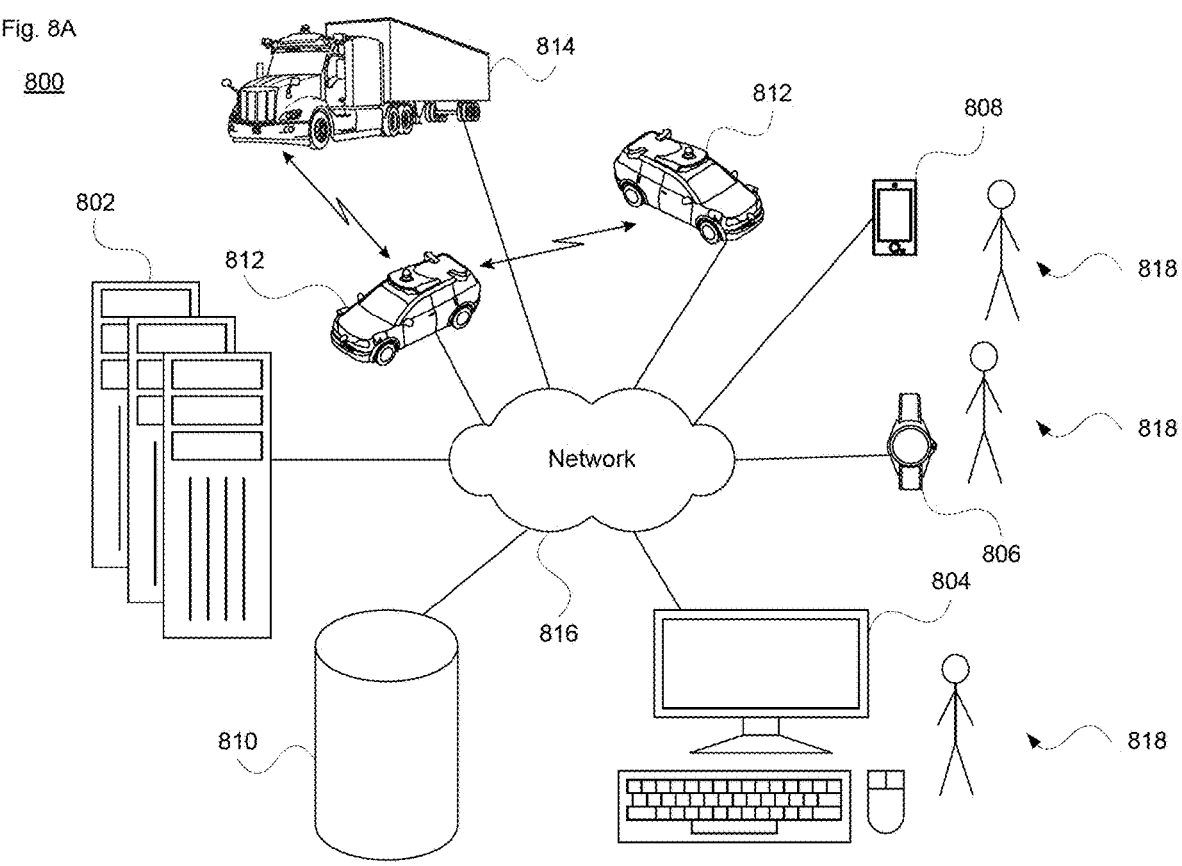
FIGS. 8A-B illustrate an example system in accordance with aspects of the technology.
Figure 8B:
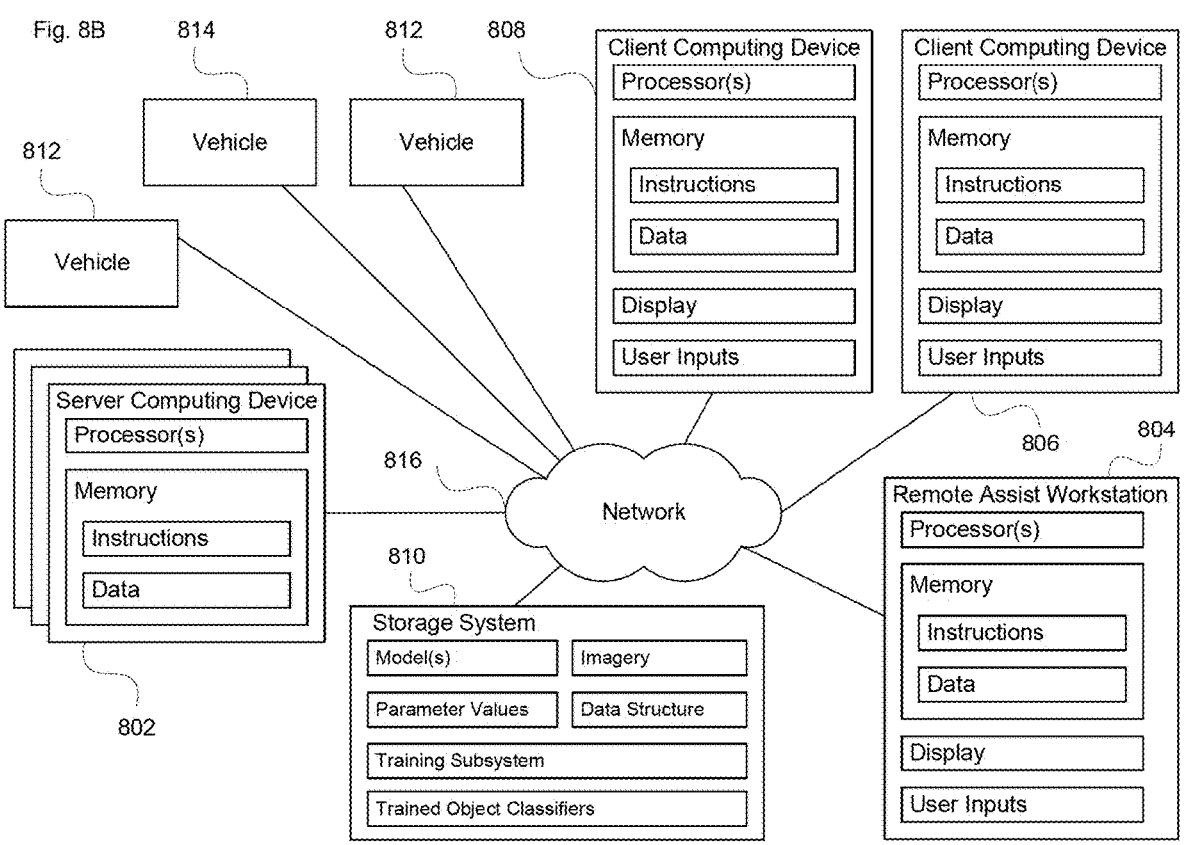

One example of a back-end system for fleet-type operation is shown in FIGS. 8A and 8B. In particular, FIGS. 8A and 8B are pictorial and functional diagrams, respectively, of an example system 800 that includes a plurality of computing devices 802, 804, 806, 808 and a storage system 810 connected via a network 816. System 800 also includes vehicles 812 and 814 configured to operate in an autonomous driving mode, which may be configured the same as or similarly to vehicles 100, 120, 140 and/or 160 of FIGS. 1A-E. Vehicles 812 and/or vehicles 814 may be parts of one or more fleets of vehicles that provide rides for passengers or deliver meals, groceries, cargo or other packages to customers. Although only a few vehicles and computing devices are depicted for simplicity, a typical system may include significantly more, such as tens or hundreds of vehicles.

As shown in FIG. 8B, each of computing devices 802, 804, 806 and 808 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 816. The network 816 and any intervening nodes may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance, computing device 802 may include one or more server computing devices that are capable of communicating with the computing devices of vehicles 812 and/or 814, as well as computing devices 804, 806 and 808 via the network 816. For example, vehicles 812 and/or 814 may be a part of a fleet of autonomous vehicles that can be dispatched by a server computing device to various locations. In this regard, the computing device 802 may function as a dispatching server computing system which can be used to dispatch vehicles to different locations in order to pick up and drop off passengers or to pick up and deliver cargo or other items. In addition, server computing device 802 may use network 816 to transmit and present information to a user of one of the other computing devices or a rider in a vehicle. In this regard, computing devices 804, 806 and 808 may be considered client computing devices.

As shown in FIGS. 8A-B each client computing device 804, 806 and 808 may be a personal computing device intended for use by a respective user 818, and have all of the components normally used in connection with a personal computing device including a one or more processors (e.g., a central processing unit (CPU), graphics processing unit (GPU) and/or tensor processing unit (TPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 806 and 808 may be mobile phones or devices such as a wireless-enabled PDA, a tablet PC, a wearable computing device (e.g., a smartwatch), or a netbook that is capable of obtaining information via the Internet or other networks.

In some examples, client computing device 804 may be a remote assistance workstation used by an administrator or operator to communicate with riders of dispatched vehicles. Although only a single remote assistance workstation 804 is shown in FIGS. 8A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to help process sign-related, including labeling of different types of signs.

Storage system 810 can be of any type of computerized storage capable of storing information accessible by the server computing devices 802, such as a hard-drive, memory card, ROM, RAM, DVD, CD-ROM, flash drive and/or tape drive. In addition, storage system 810 may include a distributed storage system where data is stored on a plurality of different storage devices which may be physically located at the same or different geographic locations. Storage system 810 may be connected to the computing devices via the network 816 as shown in FIGS. 8A-B, and/or may be directly connected to or incorporated into any of the computing devices.

Storage system 810 may store various types of information. For instance, the storage system 810 may store autonomous vehicle control software which is to be used by vehicles, such as vehicles 812 or 814, to operate such vehicles in an autonomous driving mode. Storage system 810 may also store one or more models and data for training the models such as imagery, parameter values for the model, a data structure of different training information such as geolocation data, etc. The storage system 810 may also store a training subsystem to train the model(s), as well as resultant information such as trained classifiers. The trained object classifiers may be shared with specific vehicles or across the fleet as needed. They may be updated in real time, periodically, or off-line as additional training input data is obtained. The storage system 810 can also include route information, weather information, etc. This information may be shared with the vehicles 812 and 814, for instance to help with operating the vehicles in an autonomous driving mode.

Figure 9:
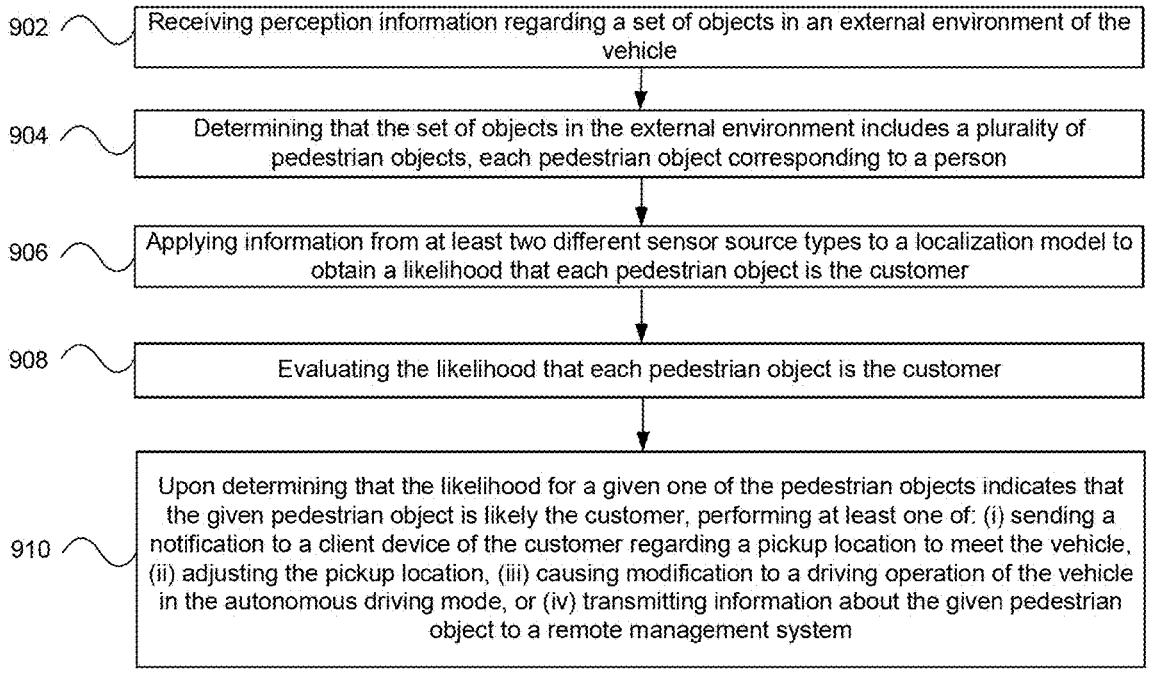
FIG. 9 illustrates an example method in accordance with aspects of the technology.

FIG. 9 illustrates a flow diagram 900 according to one aspect of the technology, which provides a method for identifying a customer of a vehicle that is configured to operate in an autonomous driving mode. The customer may be a rider, person receiving a package, food order or groceries, a store employee loading the vehicle, etc. At block 902, the method includes receiving, by one or more processors of a computing system of the vehicle, perception information regarding a set of objects in an external environment of the vehicle. At block 904, the method includes determining, by the one or more processors, that the set of objects in the external environment includes a plurality of pedestrian objects, each pedestrian object corresponding to a person. At block 906, information is applied from at least two different sensor source types to a localization model to obtain a likelihood that each pedestrian object is the customer. At block 908 the method includes evaluating, by the one or more processors, the likelihood that each pedestrian object is the customer. And at block 910, upon determining that the likelihood for a given one of the pedestrian objects indicates that the given pedestrian object is likely the customer, the method includes performing at least one of: (i) sending a notification to a client device of the customer regarding a pickup location to meet the vehicle, (ii) adjusting the pickup location, (iii) causing modification to a driving operation of the vehicle in the autonomous driving mode, or (iv) transmitting information about the given pedestrian object to a remote management system.

While certain use cases described above focus on rider pickup situations in the ride hailing context, the technology may be used in many other situations. This can include delivery situations, where the person going to the vehicle may be a restaurant or store employee loading the vehicle with a meal, groceries, prescription or other package. Or the person may be the customer who is retrieving the package from the vehicle. Here, proximity unlocking may be particularly helpful with the door or trunk being opened when the person is very close to the vehicle. Similarly, in a trucking scenario, the person or people heading to the vehicle could be warehouse workers that will load or unload the truck with cargo, or that need to transfer cargo to or from the truck (e.g., a mail delivery truck).

And alternative to ridesharing, the technology may be used in a personal car ownership situation. For instance, the autonomous vehicle may have dropped off its owner at a particular location (their office, gym, grocery store, etc.) and then parked at an available spot. Here, the system could identify when their owner is walking toward the vehicle and signal to them, open the door, etc., as described above. Also, different protocols could apply in the case of ownership, with adjustments being made for proximity unlocking or early boarding in accordance with the owner's preferences.

Finally, the technology provides enhanced flexibility to preposition one or more vehicles of a fleet. This may be done to reduce how long it takes each vehicle to arrive at the selected destination for each respective pickup. In addition, the fleet management system may instruct certain vehicles to position themselves at particular locations to improve sensor coverage across a group of vehicles. This could be particularly beneficial when multiple people are leaving one place after an event (e.g., a movie or sporting event lets out) and different people may be using different vehicles for the ride home.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method for identifying a customer of a vehicle that is configured to operate in an autonomous driving mode, the method comprising:
determining, by one or more processors of a computing system of the vehicle based at least on (i) first information from a client device of the customer and (ii) second information from a sensor source type other than the client device, whether one or more pedestrian objects detected in an external environment of the vehicle correspond to the customer, wherein the first information includes at least one of a gesture associated with the customer, a gaze of the customer, a sound from the client device, or illumination of a light of the client device; and
responsive to determining that the one or more pedestrian objects correspond to the customer, performing, by the one or more processors, to improve wayfinding of the customer to the vehicle at a pickup location, at least one of: (i) causing presentation of a notification on the client device associated with the wayfinding of the customer to the vehicle at the pickup location, (ii) adjusting the pickup location, or (iii) causing modification to a driving operation of the vehicle in the autonomous driving mode.

2. The method of claim 1, wherein the sensor source type other than the client device is selected from either (i) vehicle sources that are onboard the vehicle, or (ii) fleet sources obtained from one or more other vehicles in a fleet of vehicles.

3. The method of claim 2, wherein the vehicle sources include one or more sensors of a perception system of the vehicle, positioning system sources, or communication system sources.

4. The method of claim 3, wherein the one or more sensors of the perception system include one or more of lidar, camera, radar or acoustical sensors.

5. The method of claim 1, wherein:
the first information further includes geolocation information from the client device, and
the second information includes perception information from one or more sensors of a perception system of the vehicle.

6. The method of claim 1, further comprising refining, by the one or more processors based on at least one of the first or the second information, a list of pedestrian objects that could be the customer.

7. The method of claim 1, wherein causing the presentation of the notification on the client device includes requesting current or historical geolocation information of the client device.

8. The method of claim 1, wherein the notification includes updated walking directions or turn-by-turn directions.

9. The method of claim 1, wherein the notification includes a request for the customer to perform a selected action.

10. The method of claim 1, wherein causing the presentation of the notification on the client device includes selecting a timing for presenting the notification on the client device based on a distance of the one or more pedestrian objects to either the pickup location or to the vehicle.

11. The method of claim 1, wherein causing the presentation of the notification on the client device includes selecting a specificity of a message to the customer based on a distance of the one or more pedestrian objects to either the pickup location or to the vehicle.

12. The method of claim 1, wherein the customer is a rider scheduled to be picked up by the vehicle for a trip.

13. The method of claim 1, wherein adjusting the pickup location includes moving the pickup location to a position closer to a current location of the customer to reduce a distance the customer would traverse.

14. The method of claim 1, further comprising, responsive to determining that the one or more pedestrian objects correspond to the customer, transmitting information about the one or more pedestrian objects to a remote management system.

15. The method of claim 14, wherein transmitting information about the one or more pedestrian objects to the remote management system includes a request for rider support from the remote management system.

16. A control system of a vehicle configured to operate in an autonomous driving mode, the control system comprising one or more processors configured to:
determine, based at least on (i) first information from a client device of a customer and (ii) second information from a sensor source type other than the client device, whether one or more pedestrian objects detected in an external environment of the vehicle correspond to the customer, wherein the first information includes at least one of a gesture associated with the customer, a gaze of the customer, a sound from the client device, or illumination of a light of the client device; and
responsive to a determination that the one or more pedestrian objects correspond to the customer, perform, to improve wayfinding of the customer to the vehicle at a pickup location, at least one of: (i) cause presentation of a notification on the client device associated with the wayfinding of the customer to the vehicle at the pickup location, (ii) adjust the pickup location, or (iii) cause modification to a driving operation of the vehicle in the autonomous driving mode.

17. The control system of claim 16, wherein:
the first information further includes geolocation information from the client device, and
the second information includes perception information from one or more sensors of a perception system of the vehicle.

18. The control system of claim 16, wherein the one or more processors are further configured to refine a list of pedestrian objects that could be the customer based on at least one of the first or the second information.

19. The control system of claim 16, wherein the one or more processors are further configured to issue a request to the client device for updated location information in response to the customer being within a threshold proximity to the vehicle or to the pickup location.

20. The control system of claim 16, wherein the one or more processors are further configured to:
issue a request for one or more other vehicles to provide sensor information from the external environment of the vehicle; and
apply the provided sensor information to a localization model.

21. The control system of claim 16, wherein the one or more processors are further configured to, responsive to the determination that the one or more pedestrian objects correspond to the customer, transmit information about the one or more pedestrian objects to a remote management system.

22. A method for identifying a customer of a vehicle that is configured to operate in an autonomous driving mode, the method comprising:
- determining, by one or more processors of a computing system of the vehicle based at least on (i) first information from a client device of the customer and (ii) second information from a sensor source type other than the client device, whether one or more pedestrian objects detected in an external environment of the vehicle correspond to the customer;
- responsive to determining that the one or more pedestrian objects correspond to the customer, performing, by the one or more processors, to improve wayfinding of the customer to the vehicle at a pickup location, at least one of: (i) causing presentation of a notification on the client device associated with the wayfinding of the customer to the vehicle at the pickup location, (ii) adjusting the pickup location, or (iii) causing modification to a driving operation of the vehicle in the autonomous driving mode; and
- refining, by the one or more processors based on at least one of the first or the second information, a list of pedestrian objects that could be the customer.

23. A method for identifying a customer of a vehicle that is configured to operate in an autonomous driving mode, the method comprising:
- determining, by one or more processors of a computing system of the vehicle based at least on (i) first information from a client device of the customer and (ii) second information from a sensor source type other than the client device, whether one or more pedestrian objects detected in an external environment of the vehicle correspond to the customer; and
- responsive to determining that the one or more pedestrian objects correspond to the customer, performing, by the one or more processors, to improve wayfinding of the customer to the vehicle at a pickup location, causing presentation of a notification on the client device associated with the wayfinding of the customer to the vehicle at the pickup location,
- wherein causing the presentation of the notification on the client device includes requesting current or historical geolocation information of the client device, or the notification includes updated walking directions or turn-by-turn directions.

24. A control system of a vehicle configured to operate in an autonomous driving mode, the control system comprising one or more processors configured to:
- determine, based at least on (i) first information from a client device of a customer and (ii) second information from a sensor source type other than the client device, whether one or more pedestrian objects detected in an external environment of the vehicle correspond to the customer;
- refine a list of pedestrian objects that could be the customer based on at least one of the first or the second information; and
- responsive to a determination that the one or more pedestrian objects correspond to the customer, perform, to improve wayfinding of the customer to the vehicle at a pickup location, at least one of: (i) send a notification to the client device regarding a pickup location to meet the vehicle, (ii) adjust the pickup location, (iii) cause modification to a driving operation of the vehicle in the autonomous driving mode, or (iv) transmit information about the one or more pedestrian objects to a remote management system.

* * * * *